United States Patent
Ream et al.

(10) Patent No.: US 7,797,909 B2
(45) Date of Patent: Sep. 21, 2010

(54) APPARATUS FOR PACKAGING NON-CONTACT PRINTED COMESTIBLE PRODUCTS

(75) Inventors: Ronald L. Ream, Plano, IL (US); Enrique Valdez, Oak Lawn, IL (US); Mitchell B. Dikselis, Lemont, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 0 days.

(21) Appl. No.: 11/875,545

(22) Filed: Oct. 19, 2007

(65) Prior Publication Data
US 2008/0152756 A1 Jun. 26, 2008

Related U.S. Application Data

(60) Provisional application No. 60/862,148, filed on Oct. 19, 2006.

(51) Int. Cl.
*B65B 57/10* (2006.01)
*B65B 63/00* (2006.01)
*B65B 35/56* (2006.01)
*B65B 5/10* (2006.01)

(52) U.S. Cl. .............................. 53/54; 53/55; 53/111 R; 53/534; 53/544; 53/246

(58) Field of Classification Search .................... 53/54, 53/55, 246, 544, 154, 158, 534, 111 R; 426/3, 426/87, 383
See application file for complete search history.

(56) References Cited

U.S. PATENT DOCUMENTS

| | | |
|---|---|---|
| 4,528,904 A | 7/1985 | Ackley |
| 4,548,825 A | 10/1985 | Voss et al. |
| 4,672,892 A | 6/1987 | Ackley |
| 4,905,589 A | 3/1990 | Ackley |
| 5,360,116 A | 11/1994 | Schmiletzky |
| 5,433,146 A | 7/1995 | Ackley |
| 5,655,453 A | 8/1997 | Ackley |
| 5,720,149 A * | 2/1998 | Stimpfl ........................ 53/246 |
| 5,768,996 A | 6/1998 | Ackley |

(Continued)

FOREIGN PATENT DOCUMENTS

JP      03148430 A  *  6/1991

(Continued)

*Primary Examiner*—Stephen F Gerrity
(74) *Attorney, Agent, or Firm*—K&L Gates LLP

(57) ABSTRACT

The present disclosure provides an apparatus and method for packaging a non-contact printed edible substrate as well as the resultant packaged product. The packaging apparatus may include a non-contact printer, a carrier, and a package located at a discharge position. The carrier may be constructed and arranged to transport the edible substrate from the print position to the package and orient same in the package so that the printed ink indicia is visible through at least a portion of a panel of the package. At a print position, the non-contact printer is constructed and arranged to apply an edible ink indicia to an edible substrate. The packaging apparatus may form a packaged product having a plurality of compartments where at least one compartment at least partially defined by a panel. The interior of the compartment contains at least one edible substrate comprising a surface and a printed edible ink indicia on the surface so that the ink indicia is visible through at least a portion of the panel.

13 Claims, 9 Drawing Sheets

U.S. PATENT DOCUMENTS

| | | |
|---|---|---|
| 5,836,243 A | 11/1998 | Ackley |
| 6,141,943 A * | 11/2000 | Hart et al. ............... 53/246 |
| 6,267,997 B1 | 7/2001 | Ream et al. |
| 6,286,421 B1 | 9/2001 | Ackley |
| 6,648,575 B2 * | 11/2003 | Baroncini ............... 53/246 |
| 6,925,782 B2 * | 8/2005 | Aylward ............... 53/246 |
| 7,114,445 B2 | 10/2006 | Ackley, Jr. et al. |
| 7,128,100 B2 * | 10/2006 | Monti ............... 53/246 |
| 7,174,694 B2 * | 2/2007 | Ogger et al. ............... 53/246 |
| 2001/0046535 A1 * | 11/2001 | Bowling ............... 426/87 |
| 2003/0035870 A1 | 2/2003 | Ackley, Jr. et al. |
| 2004/0086603 A1 * | 5/2004 | Shastry et al. ............... 426/104 |
| 2004/0175463 A1 * | 9/2004 | Shastry et al. ............... 426/104 |
| 2006/0051457 A1 | 3/2006 | Bougoulas et al. |
| 2006/0087686 A1 | 4/2006 | Anderson et al. |
| 2006/0096656 A1 | 5/2006 | Stueckle |
| 2006/0210681 A1 | 9/2006 | Churnick |
| 2006/0228451 A1 | 10/2006 | Martin |

FOREIGN PATENT DOCUMENTS

| | | |
|---|---|---|
| WO | 2004/080191 A1 | 9/2004 |

\* cited by examiner

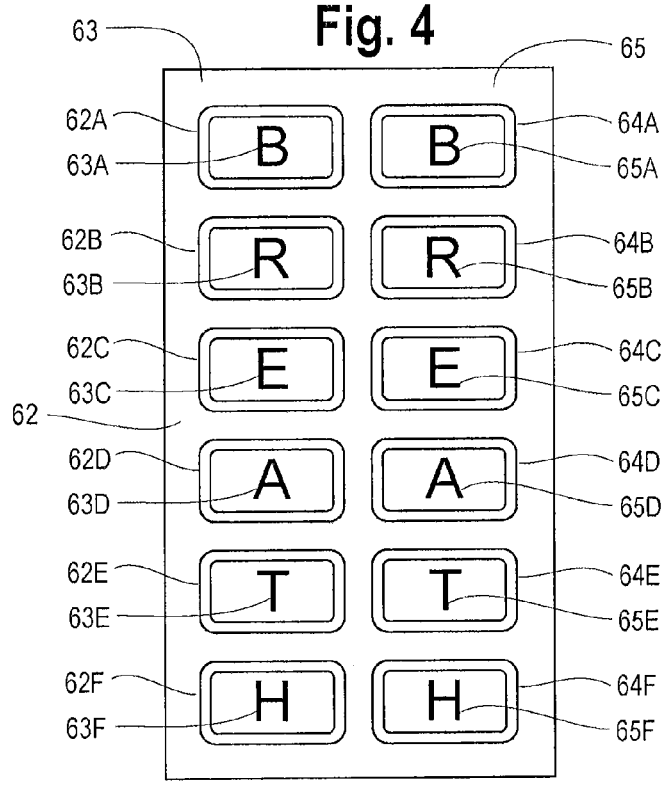
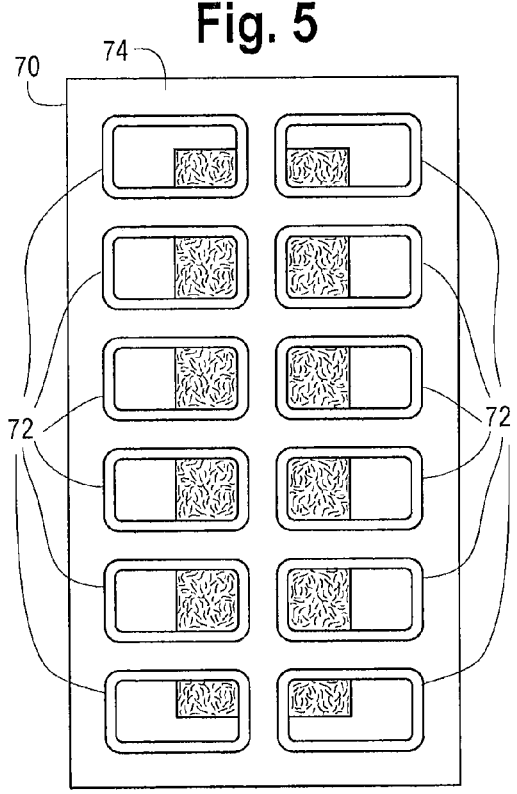
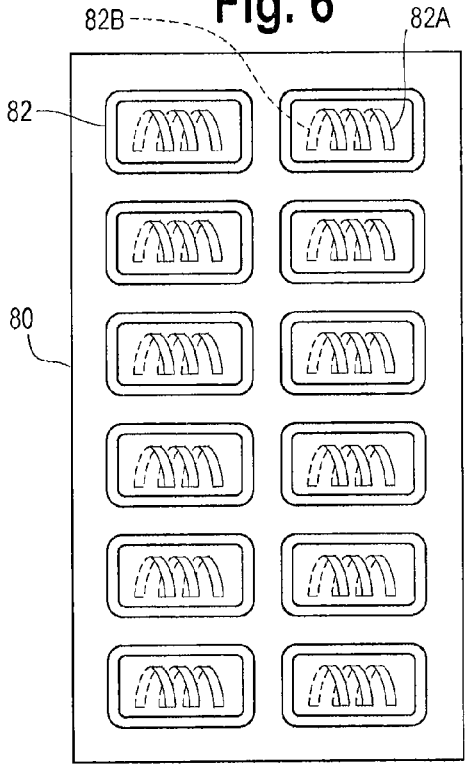

APPARATUS FOR PACKAGING NON-CONTACT PRINTED COMESTIBLE PRODUCTS

BACKGROUND

In the confectionery and chewing gum arts, continual efforts are directed toward producing ever-more appealing candy and chewing gum products to promote marketability. Traditional approaches aimed at increasing product appeal have included product reformulations as well as product repackaging. Such modifications, however, entail major undertakings that require great expenditures of time, money, and effort. Product reformulations, for example, require funding for research and development, highly skilled research personnel, and long periods of time for product testing. Product repackaging requires design creativity, as well as time and effort to re-tool complicated packaging equipment.

A need therefore exists for a simple, quick, and cost-effective apparatus and method, readily adaptable to high speed and large-scale processing equipment that may enhance conventional confectionery and chewing gum products to increase product appeal. A need further exists for marketing and advertising techniques that introduce comestible products into new market segments and thereby increase consumer awareness of comestible products.

SUMMARY

The present disclosure provides packaged product, apparatuses, and methods of comestibles with improved consumer appeal. In particular, non-contact printing of edible materials onto edible substrates is utilized to create multi-sensory enhancements to comestible products. The comestible products of the present disclosure provide a visually attractive product that brings added excitement and enjoyment to product consumption.

In an embodiment, a packaged product is provided. The packaged product includes a package having a plurality of compartments. At least one compartment is at least partially defined by a panel. The product further includes an interior of the compartment that contains at least one edible substrate including a surface. An online-printed edible ink indicia is on the surface so that the ink indicia is visible through at least a portion of the panel. Alternatively, the package may include a seal where the ink indicia is distal from the seal.

In an embodiment, the edible substrate has a uniform orientation with respect to at least one edible substrate in the package. The uniform orientation of the edible substrate may include, for example, an identical configuration, an opposite configuration, a portion of a multiple edible substrate design, a portion of a design encompassing all the edible substrates of the packaged product, or combinations thereof.

In an embodiment, the interior of every compartment contains at least one edible substrate including a surface and a printed edible ink indicia on the surface so that the ink indicia is visible through at least a portion of the panel.

In an embodiment, the printed edible ink indicia is a non-contact printed edible ink indicia. In a further embodiment, the ink indicia contacts an inner surface of the panel with substantially none of the ink indicia adhering to the inner surface.

In an embodiment, the product further includes a second edible ink indicia on a surface of the edible substrate. Further, the edible ink indicia may be on a first surface of the edible substrate and the second edible ink indicia may be on a second surface of the edible substrate.

In another embodiment, at least one compartment contains at least two edible substrates such that the ink indicia of each edible substrate is visible through at least one portion of the panel.

The edible substrate may take different forms including, for example, a confectionery product, a center-filled product, a coated edible substrate, an uncoated edible substrate, an edible substrate having a curved surface contour, a chewing gum stick, a chewing gum pellet, or combinations thereof. Alternatively, the edible substrate is a coated chewing gum pellet.

The edible ink indicia may also take different forms including, for example, a multicolored ink indicia. The edible ink indicia may further include, for example, a word, an image, a color, a symbol, an object, an alpha-numeric representation, a letter, text, a shape, a fanciful shape, a symbol, a logo, a graphic, an advertising indicia, or combinations thereof.

In an embodiment, a packaged product is provided. The packaged product includes a package having a plurality of compartments. In the embodiment, each compartment is at least partially defined by a panel. Moreover, an interior of each compartment contains at least one edible substrate including a surface. Each substrate also includes a printed edible ink indicia and an organoleptic component on the surface so that the ink indicia is visible through at least one portion of a panel. The edible substrate may also have uniform orientation with respect to an adjacent edible substrate.

In an embodiment, the product further includes an organoleptic component corresponding to a feature of the edible ink indicia. The feature may include, for example, a word, an image, a color, a symbol, an object, an alpha-numeric representation, a letter, text, a shape, a fanciful shape, a symbol, a logo, a graphic, an advertising indicia, an indentation, a protrusion, or combinations thereof.

In another embodiment, the organoleptic component may be a component of the edible ink indicia. The organoleptic component may include, for example, a flavoring agent, a cooling agent, a heating agent, a mouthfeel agent, a tingling agent, a sweetening agent, a souring agent, a bittering agent, a teeth whitening agent, a breath freshening agent, an anti-cavity agent, an audible agent, or combinations thereof.

In an embodiment, a packaged product is provided. The packaged product includes a package having a plurality of compartments with each compartment at least partially defined by a panel. Moreover, an interior of each compartment contains at least one edible substrate including a surface. Each substrate also includes a printed edible ink indicia on the surface so that the ink indicia is visible through at least one portion of a panel. In this embodiment, the edible substrate has a uniform orientation with respect to an adjacent edible substrate.

In an embodiment, a packaged product is provided. The packaged product includes a package having a plurality of compartments with each compartment at least partially defined by a panel. Each compartment also contains at least one edible substrate including a surface. In this embodiment, the edible substrate has a plurality of printed edible ink indicia on the surface and at least one edible ink indicia visible through at least a portion of the panel.

In an embodiment, a packaged product is provided. The packaged product includes a package having a plurality of compartments with each compartment at least partially defined by a panel. Each compartment also contains at least one edible substrate comprising at least a first and second surface. The edible substrate includes a first printed edible ink indicia on the first surface and a second printed edible ink indicia on the second surface. In this embodiment, at least one edible ink indicia is visible through at least a portion of the panel.

In another embodiment, the edible substrate has uniform orientation with respect to an adjacent edible substrate. Alternatively, the first surface of the edible substrate has uniform orientation with respect to the second surface of the edible substrate.

In an embodiment, an apparatus is provided. The apparatus includes a non-contact printer so constructed and arranged to apply an edible ink indicia to an edible substrate. The printer is located at a print position. Further, a package is located at a discharge position. The embodiment also includes a carrier so constructed and arranged to transport the edible substrate from the print position to the package and orient the edible substrate in the package so that the printed ink indicia is visible through at least a portion of a panel of the package. The carrier may be a continuous conveyor or a rotatable drum.

In another embodiment, the edible substrate may be a coated edible substrate, an uncoated edible substrate, an edible substrate having a curved surface contour, or combinations thereof.

In an embodiment, the carrier includes a plurality of pockets, each pocket constructed to house an edible substrate. Further, the apparatus may include a feeder in operative communication with the carrier, the feeder delivering an edible substrate to each pocket. The feeder may further include an alignment device such as, for example, a vibration tray, a brush, or combinations thereof. Alternatively, the apparatus includes a guide proximate to the carrier, the guide maintaining the edible substrates in the pockets until the edible substrates reach the discharge position.

In an embodiment, the package includes a plurality of compartments. Further, the ink indicia of the edible substrate may be visible through a panel of each compartment.

In an embodiment, each pocket includes an orifice in operative communication with a pressurizer. The pressurizer applies a positive pressure to eject the edible substrate from the pocket when the edible substrate is at the discharge position.

In another embodiment, the apparatus includes a transporter that moves the compartments to a load position where the edible substrates move from the compartments to respective pockets at the load position. Further, each pocket may include an orifice in operative communication with a retainer where the retainer applies a negative pressure to lift the edible substrates from the compartments and into respective pockets.

In an embodiment, an apparatus is provided. The apparatus includes a first non-contact printer so constructed and arranged to apply a first edible ink indicia to an edible substrate. The first non-contact printer is located at a first print position. Further, a package is located at a discharge position. The apparatus also includes a first carrier so constructed and arranged to transport the edible substrate from the first print position to the package and orient the edible substrate in the package so that the first ink indicia is visible through at least a portion of a panel of the package. The apparatus also includes a second printer so constructed and arranged to apply a second edible ink indicia to the edible substrate. The second printer is located at a second print position. Finally, the apparatus includes a second carrier so constructed and arranged to transport the package containing the edible substrate to the second print position.

In another embodiment, the first non-contact printer is arranged to apply the first edible ink indicia on a first surface of the edible substrate and the second printer is arranged to apply the second edible ink indicia on a second surface of the edible substrate. Moreover, the first non-contact printer may be in operative communication with the second printer.

In an embodiment, an apparatus is provided. The apparatus includes a feeder that receives a plurality of edible substrates. Each edible substrate has at least one side, with an ink indicia on a side of the edible substrate. The apparatus includes a carrier that is in operative communication with the feeder and has a plurality of pockets. A detector is located proximate to the carrier and may be adapted to detect a misoriented edible substrate in at least one of the pockets of the carrier. The apparatus further includes a controller that is in operative communication with the detector and an extractor. In this embodiment, the extractor is adapted to remove the misoriented edible substrate from the pocket.

In an embodiment, the apparatus includes a package having a plurality of compartments. The package is located at a first discharge position. In this embodiment, the carrier is constructed and arranged to discharge the edible substrates into a respective compartment of the package at the first discharge position. Further, the ink indicia for each edible substrate is visible through a panel of the compartment.

In an embodiment, the apparatus includes a second carrier constructed and arranged to move the edible substrates in the package to a print position. The printer may be arranged to print a second ink indicia on a second side of each edible substrate at the print position.

In another embodiment, the apparatus includes a recycle device in operative communication with the extractor. In this embodiment, the recycle device is adapted to deliver the misoriented edible substrate to a second discharge position. Further, the apparatus may include a package located at the second discharge position, the package constructed and arranged to receive the misoriented edible substrate in a compartment of the package so that the ink indicia of the edible substrate is visible through a panel of the compartment and the edible substrate is no longer misoriented.

In an embodiment, an apparatus is provided. The apparatus includes a feeder receiving a plurality of edible substrates. Each edible substrate has at least one side with each edible substrate having an ink indicia on a side of the edible substrate. The apparatus includes a drum in operative communication with the feeder. The drum has a plurality of pockets on an outer circumferential surface thereof and the drum is adapted to rotate to a discharge position. The apparatus also includes a detector proximate to the drum outer circumferential surface. The detector is adapted to detect a misoriented edible substrate in at least one of the pockets of the drum. The apparatus further includes a controller in operative communication with the detector and a retainer, where the retainer is adapted to selectively retain the misoriented edible substrate in the pocket at the discharge position.

In an embodiment, the apparatus includes a package that has a plurality of compartments located at the discharge position. In this embodiment, the drum is adapted to discharge each edible substrate to a respective compartment so that the ink indicia for each edible substrate is visible through a panel of the compartment. The apparatus may further include a sensor at the discharge position. The sensor may be in operative communication with the controller and may be adapted to detect an empty compartment in the package at the discharge position.

In an alternative embodiment, the drum is adapted to move to a recycle position and the retainer is adapted to release the misoriented edible substrate into a recycle device.

In another embodiment, the apparatus includes a printer proximate to the package. In this embodiment, the printer is constructed and arranged to print a second edible ink indicia on each edible substrate in a compartment.

In an embodiment, a method is provided. The method includes non-contact printing an edible ink indicia on a plurality of edible substrates. At least one edible substrate is placed in each of a plurality of compartments of a package so that the ink indicia is visible through at least a portion of a panel of each respective compartment, each compartment being at least partially defined by the panel. The method may further include flipping the edible substrate and contacting the ink indicia with an inner surface of the front panel. The method may also include sealing the package with a seal.

In an embodiment, at least one edible substrate is placed in each of the plurality of compartments of the package from about 0.1 seconds to about 60 seconds after the non-contact printing. Moreover, the method may include drying the ink indicia before the placing.

In another embodiment, the method further includes printing a second ink indicia on the edible substrate. The edible ink indicia may be on a first surface of the edible substrate and the second ink indicia may be on a second surface of the edible substrate.

In an embodiment, a method is provided. The method includes housing a plurality of edible substrates on an outer surface of a drum. The drum is rotated to move the edible substrates to a print position. The method also includes non-contact printing an edible ink indicia on each edible substrate when each edible substrate is at the print position and placing at least one edible substrate in each of a plurality of compartments of a package so that the ink indicia is visible through at least one portion of a panel of each compartment.

In an embodiment, the method includes placing the package at a discharge position below the rotatable drum, rotating the drum to move the edible substrates to the discharge position, and moving the edible substrates from the drum into respective compartments. The method may further include continuously feeding the edible substrates to a plurality of pockets located on the outer surface of the drum.

In another embodiment, each compartment contains an edible substrate. The method further includes transporting the compartments to a load position proximate to the drum and transferring each edible substrate from the compartment to a respective pocket located on an outer surface of the drum.

In an embodiment, a method is provided. The method includes feeding a plurality of edible substrates onto a carrier where each edible substrate has at least one side and an edible ink indicia is on a single side of the edible substrate. The method further includes delivering with the carrier the edible substrates to a discharge position, detecting the presence of a misoriented edible substrate on the carrier, and removing the misoriented edible substrate from the carrier before delivering the edible substrates to a package located at the discharge position.

In another embodiment, the package comprises a plurality of compartments. The method further includes moving, at the discharge position, each edible substrate from the carrier into a respective compartment, the ink indicia of each edible substrate visible through the panel. The method may also include printing a second edible ink indicia on a second side of each edible substrate in a compartment.

In an embodiment, a method is provided. The method includes feeding a plurality of edible substrates onto an outer surface of a rotatable drum that can support the edible substrates on the outer surface. Each edible substrate has more than one side and each edible substrate has an edible ink indicia on a side thereof. The method also includes detecting the presence of a misoriented edible substrate on the drum outer surface. Further, the method includes moving, with the rotatable drum, the edible substrates to a discharge position and retaining the misoriented edible substrate on the drum outer surface at the discharge position.

In an embodiment, a package having a plurality of compartments is located at the discharge position and each compartment is at least partially defined by a panel. The method further includes moving, at the discharge position, each edible substrate other than the misoriented edible substrates from the rotatable device into a respective compartment so that at least one portion of the ink indicia is visible through the panel. The method may also include printing a second ink indicia on a second surface of each edible substrate in a compartment.

In another embodiment, the method further includes moving, with the rotatable drum, the misoriented edible substrate to a recycle position and releasing the misoriented edible substrate into a recycle device.

In an embodiment, a method is provided. The method includes feeding a plurality of edible substrates onto a first carrier, delivering with the first carrier the edible substrates to a first print position, and non-contact printing a first edible ink indicia on the edible substrates. The method further includes placing with the first carrier the edible substrates into a package so that the ink indicia is visible through at least one portion of a panel of the package. The method also includes transporting with a second carrier the edible substrates in the package to a second print position and printing a second edible ink indicia on the edible substrates.

In an embodiment, the first carrier comprises a plurality of pockets, the first carrier delivering the edible substrates to a first print position with each pocket housing a respective edible substrate.

In an embodiment, the package further comprises a plurality of compartments, the method further comprising discharging at least one edible substrate into each compartment.

In another embodiment, the first edible ink indicia is on a first surface of the edible substrate and the second ink indicia is on a second surface of the edible substrate.

It is an advantage of the present disclosure to provide an improved packaged product with an edible substrate having an ink indicia, the ink indicia viewable by a consumer through the package.

It is an advantage of the present disclosure to provide a package having an edible substrate in each compartment, the non-contact printed edible ink indicia of each edible substrate being visible through a panel of each respective compartment.

It is an advantage of the present disclosure to provide a packaged product with increased consumer appeal.

It is an advantage of the present disclosure to provide a packaged product with a plurality of edible substrates that have uniform orientation with respect to each other.

It is an advantage of the present disclosure to provide a packaged product that has multiple printed ink indicia on a single surface or multiple surfaces.

It is an advantage of the present disclosure to provide an apparatus with improved control of the orientation of an edible substrate in a package.

It is an advantage of the present disclosure to provide an apparatus that places edible substrates into a package so that the ink indicia of each edible substrate is viewable by a consumer through the package.

It is an advantage of the present disclosure to provide an apparatus that reduces the amount of handling of ink indicia imprinted edible substrates.

It is an advantage of the present disclosure to provide an apparatus that reduces or eliminates the risk of smudging ink indicia printed on edible substrates.

It is an advantage of the present disclosure to provide an apparatus that can detect and recycle misoriented finished product before packaging the product.

It is an advantage of the present disclosure to provide a method for producing a packaged product with increased consumer appeal.

It is an advantage of the present disclosure to provide a method for detecting and recycling misoriented finished product before packaging the product.

It is an advantage of the present disclosure to provide a method for non-contact printing ink indicia on a blank packaged product or a printed packaged product.

It is an advantage of the present disclosure to provide a method for producing a packaged product that includes a plurality of edible substrates that have uniform orientation with respect to each other.

Additional features and advantages are described herein, and will be apparent from, the following Detailed Description and the figures.

BRIEF DESCRIPTION OF THE FIGURES

FIG. 4 is a top view of a packaged product in accordance with an embodiment of the present disclosure.

FIG. 5 is a top view of a packaged product in accordance with an embodiment of the present disclosure.

FIG. 6 is a top view of a packaged product in accordance with an embodiment of the present disclosure.

DETAILED DESCRIPTION

Figure 1:
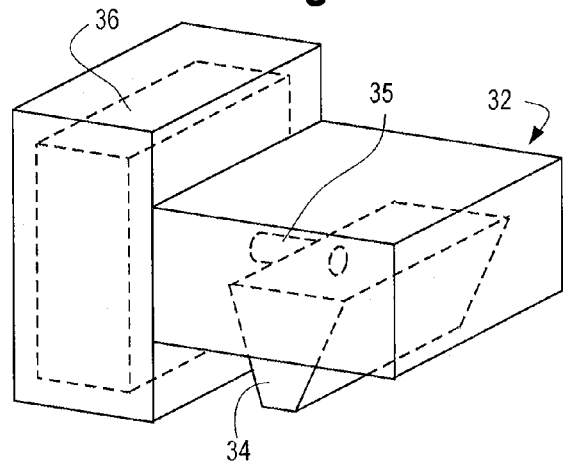
FIG. 1 is a perspective view of a printer in accordance with the an embodiment of the present disclosure.

Referring to the Figures generally, where like reference numerals denote like structure and elements, and in particular to FIG. 1, a perspective view of a printer 32 for printing on an edible substrate is shown. It should be understood that an "edible" product or "edible" substrate is a composition that is suitable for consumption and is non-toxic. An edible substrate may also be a material that complies with applicable standards such as food, drug, cosmetic (FD&C) regulations in the United States and/or Eurocontrol experimental center (E.E.C.) standards in the Euslaban Union. Non-limiting examples of suitable edible substrates include confectionery materials, pasta, extruded snacks such as crackers and snack chips, marshmallows, pastries, pet food, cereals, sausage, and cheese.

In an embodiment, the edible substrate may be a coated edible substrate, an uncoated edible substrate, an edible substrate having a curved surface contour, a chewing gum stick, a chewing gum pellet, or combinations thereof. Moreover, the edible substrate may be a coated chewing gum pellet.

The edible substrate may also be a confectionery product. The confectionery product may be any hard candy, soft candy, chewing gum, or other confectionery substance, or compound that has a fluid phase or may take a flowable form. In other words, the confectionery material may be any material that may be heated, melted, dissolved melted, form a syrup, or be dissolved in a liquid to become flowable as is commonly known in the art. The skilled artisan will appreciate that the moisture content (and concomitant viscosity) of the confectionery material may vary greatly. The moisture content of the flowable phase of the confectionery substrate may typically be in the range of about 0.5% to about 20% by weight of the confectionery material. The flowable confectionery material may be subsequently cooled or solidified at room temperature to form a solid or semi-solid confectionery. Non-limiting examples of suitable confectionery materials that are flowable or may be placed into a flowable state include syrups, liquids or solids for making hard candies, soft candies, lollipops, fondants, toffees, jellies, chewing gums, chocolates, gelatins and nougats. The confectionery material may include sugar or may be sugar-free. Coloring may be added to the confectionery substrate as desired. The confectionery material may also include a pharmaceutical product or a medicament.

In an embodiment, the edible substrate may be a center-filled product. Non-limiting examples of suitable center fill materials include any liquid, syrup, paste, colloid, or solid edible material such as boiled candy, hard candy, soft candy, toffee, jelly, syrup, paste, chewing gum, bubble gum, chocolate, gelatin, caramel, taffy, nougat, granular candy, and combinations thereof.

As shown in FIG. 1, the printer 32 may be an ink jet printer. Ink jet printers typically entail a print head in fluid communication with one or more ink reservoirs, the print head adapted for ink-jettable printing. In ink jet printing, the print head ejects or otherwise "jets" fine droplets of ink from the reservoir onto a receiving substrate. It is understood that printer 32 may be configured to dispense or jet ink compositions or other fluids therefrom. Indeed, any jettable fluid may be dispensed from printer 32. A "jettable" fluid or material may be any material (solid or liquid) that has properties sufficient to allow the material to be selectively deposited by an ink jet material dispenser as is commonly known in the art. Ink jet printing is advantageous, particularly with respect to comestibles as it provides 1) high resolution printing and 2) non-contact with the comestible thereby avoiding the risk of damage to the comestible item. Non-limiting examples of suitable non-contact printers include ink jet printing systems such as thermally actuated ink jet dispensers, mechanically actuated ink jet dispensers, electrostatically actuated ink jet dispensers, magnetically actuated ink jet dispensers, continuous ink jet printers, drop-on-demand (also called "impulse") ink jet printers, and acoustic ink jet systems.

In continuous inkjet systems, ink is emitted in a continuous stream under pressure through at least one nozzle. The stream is broken up into droplets by applying vibration or pressure pulses to the ink. This can be achieved by vibrating the nozzle or the nozzle assembly by means of a piezoelectric crystal, or by immersing a vibration probe, for example a piezoelectric crystal rod, in the ink itself. Typically, the ink droplets in continuous ink-jet systems are formed by a piezoelectric crystal, which is vibrated at controlled frequency adjacent to the ink stream. To control the flow of ink droplets, the ink is charged by applying a voltage between the ink jet before it breaks up into droplets and a charge electrode, so that each droplet carries a known charge. The charged droplets then pass through a deflection electric field where they are deflected from their straight line of flight by the deflection field applied. The extent of deflection will determine the point at which the droplets strike a substrate passing the printer and the charge and/or deflection fields are varied to direct the droplets to the desired location on the substrate. Droplets which are not to be printed are not deflected but are caught in a catcher or gutter and are returned to the ink reservoir for re-use.

Drop-on-demand jet systems include piezojet and bubble-jet (sometimes referred to as thermal ink-jet) systems. In bubblejet systems, a bubble is formed by a resistance heater in an ink reservoir. The resulting pressure wave from the bubble forces ink through the orifice plate, and as the heat is removed, the bubble begins to collapse and a droplet is ejected. Alternatively, the drop-on-demand system may form discrete droplets of ink which are ejected from an array of nozzles past which the substrate passes, the nozzles being activated at the desired frequency and in the desired order to form the desired image on the substrate. Thus, the printer may be one in which ink under pressure flows to the nozzles via valving means which are actuated under the control of a computer or the like to allow ink to flow to the required nozzle to eject a droplet from that nozzle.

In acoustic ink jet printing, one or more acoustic beams emanating from one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require small nozzles or small ejection orifices. The size of the ejection orifice is an important design parameter of an ink jet because it determines the size of the droplets of ink that the jet ejects. Acoustic printing has increased intrinsic reliability because there are no nozzles to clog. As will be appreciated, the elimination of the clogged nozzle failure mode is especially relevant to the reliability of large arrays of ink ejectors, such as arrays comprising several thousand separate ejectors. Furthermore, small ejection orifices are avoided, so acoustic printing can be performed with a large variety of inks, including inks having higher viscosities and inks containing pigments and other particulate components.

Printer 32 may include one or more jetting heads 34 in fluid communication with one or more reservoirs 36 by way of channel 35 as shown in FIG. 1A. In an embodiment, reservoirs 36 may contain ink components so that printer may deliver an ink or ink composition to the continuous slab, the individual pieces, or the coated pieces. In an embodiment, printer 32 may be configured with four reservoirs, each reservoir containing edible ink compositions in typical colors such as cyan, magenta, yellow, and black or white in order to provide multiple color images. Printer 32 may be configured with more or less reservoirs for more or less colors as desired. Each jetting head 34 may include one or more nozzles as is commonly known in the art. For example jetting head 34 may include from 1 to 10, 50, 100, 500, 1000, or 5,000 or more individual nozzles or jets. Each jetting head 34 may be in fluid communication with one or more fluid reservoirs 36. Jetting heads 34 may be arranged in any desired manner to deliver an ink composition onto continuous slab 14, 14a, pieces 24 and/or coated pieces 24a. For example, jetting heads 34 may be arranged in a single line. Alternatively, jetting heads 34 may be arranged in a series of lines to form a matrix-type printing profile.

The ink composition of the present disclosure may be any water-based, solvent-based, hot-melt, pigment-containing, or non-pigment containing edible ink as is commonly known in the art.

A water-based ink may be considered ink that contains more water than non-aqueous solvent. Water-based inks typically include water, a pigment, a dispersant (such as a polyol) for the pigment, and may contain one or more non-aqueous solvents (such as one or more alcohols) and a dye. In an embodiment, the ink composition may be a water-based pigmented ink having about 30% to about 85% by weight water, a pigment in an amount from about 3% to about 45% by weight of the ink, a dispersant, such as glycerine, polypropylene glycol, or polyethylene glycol in an amount from about 1.0% to about 50% by weight. In an embodiment, the water-based pigmented inks may contain one or more dyes in an amount from about 100 ppm to about 2% by weight.

A solvent-based ink composition may be considered an ink composition having more non-aqueous solvent than water. Solvent-based ink compositions may be either pigmented or non-pigmented and may be fat- or oil-based. In an embodiment, the solvent-based ink composition may be pigmented and have a non-aqueous solvent such as glycerine, polypropylene glycol, or polyethylene glycol present in a range from about 15% to about 80% by weight, water present in a range from about 1% to about 20% by weight, and pigment present in an amount from about 5% to about 50% by weight.

A hot-melt ink may include a dye dispersed or dissolved in a fat, wax, or oil. The wax may include any food grade wax, including such non-limiting examples as microcrystalline wax, paraffin, and natural or synthetic wax. In a further embodiment, the hot-melt edible ink may include from about 3% to about 6% by weight of an edible dye, from about 10% to about 20% by weight of hydrogenated resins, and from about 74% to about 87% by weight of a wax such as candela wax, carnauba wax, microcrystalline wax, and combinations thereof.

The edible ink composition may contain a food grade dye or lake wherein specified amounts of the dye/lake may be ingested by a human without generally causing deleterious health effects. Examples of food grade compounds include those compounds "generally recognized as safe" ("GRAS") by the United States Food and Drug Administration ("FDA") and colorants approved by the FDA for use in foods for human consumption. The food grade dyes used to produce the colored fluids may include synthetic dyes, natural dyes, or combinations thereof. As used herein, the term "dye" denotes dyes which are soluble in water and/or in the other cosolvents, which contain substantial amounts of glycols and/or glycerine, employed in the present colored fluids. Non-limiting examples of suitable synthetic dyes include food grade Pontamine, Food Black 2, FD&C-Red #3, FD&C-Red #33, FD&C-Red #40, FD&C-Blue #1, FD&C-Blue #2, FD&C-Yellow #10, FD&C-Yellow #5, FD&C-Yellow #6, and FD&C-Green #3. FD&C dyes that may be used include Red No. 3 (Erythrosine), Red No. 40 (Allura Red), Yellow No. 6 (Sunset Yel. FCF), Yellow No. 5 (Tartrazine), Green No. 3 (Fast Green FCF), Blue No. 1 (Brilliant Blue FCF), Blue No. 2 (Indigotine), and mixtures thereof. Suitable natural dyes include turmeric oleoresins, cochineal extracts, gardenia extracts, and natural colors derived from vegetable juices. Other non-limiting examples of suitable natural dyes include beet extract, grape skin extract, and chlorophyll containing extracts (e.g. nettle extract, alfalfa extract and spinach extract). To achieve a desired color tint or shade, the colored liquids may include mixtures of more than one synthetic and/or natural food grade dye. In a typical embodiment, the colored fluids contain about 0.1 to 10 wt. % food grade dye on a dissolved solids basis.

The ink composition may include additives such as flavorings, preservatives, antifoam agents, micronutrients, dispersion stabilizers, film formers, binders, a surface tension modifier, a thickening agent, an antioxidant, a preservative, a buffering agent, and/or an antimicrobial agent as commonly known in the art. The ink composition may also include adhesion enhancers such as a surfactant or a film forming resin. The surfactant may be cationic, anionic, or amphoteric and may include such non-limiting examples as polyglycerol oleate, monostearate, polysorbate, mono and diglyceride, and phospholipids such as lecithin. Non-limiting examples of suitable film forming resins may include such edible resins as acrylic co-polymers, rosin esters, shellac, polyvinyl esters, ketone resins, urea aldehyde resins, vinyl chloride/vinyl ether or vinyl acetate co-polymers, cellulose ethers and esters, polyamide resins, styrene/maleate resins, polyvinylpyrrolidone resins, vinyl pyrrolidone/vinyl acetate co-polymers, polystyrene resins, melamine resins, thermosetting acrylic resins, polyurethane resins and radiation curable acrylate resins. The ink composition may also include an organoleptic component and/or an active agent as will be described in detail below.

It is understood that the ink composition may be compatible with the printer so as not to damage the jetting head components or cause inconsistent firing of jets. The ink composition may also be compatible with the edible substrate to provide a high-resolution ink indicia that adheres to the edible substrate surface. For example, the ink may include an adhesion enhancer, such as a wax, to promote adhesion with the coating surface of a coated comestible. Further, the ink may be a solid or in a solid state at ambient temperature.

In an embodiment, printer 32 shown in FIG. 1 may be positioned anywhere before, after, or upon a packaging apparatus as desired. Printer 32 may also be arranged so as to print on an edible substrate while online.

It should be understood that an "online" printed ink indicia is an ink indicia printed on an edible substrate while the edible substrate is being packaged or after packaging. As will be described herein, online printing of edible ink indicia onto an edible substrate advantageously allows for consistent control of an edible substrate configuration in a package. For example, online printing allows for a plurality of edible substrates in a package to each have ink indicia that uniformly face the same direction, such that no misoriented edible substrates are contained in the package. Moreover, online printing allows a user flexibility to purposely orient a plurality of edible substrates in any desirable fashion in a package so as to impart a multitude of designs when viewed by a consumer.

In all embodiments of the present disclosure, edible ink indicia may be online printed on an edible substrate.

As herein described, the contents of ink composition and/or the printer 32 may be modified as necessary depending on the placement of the printer 32 with regard to the packaging apparatus.

Figure 2:
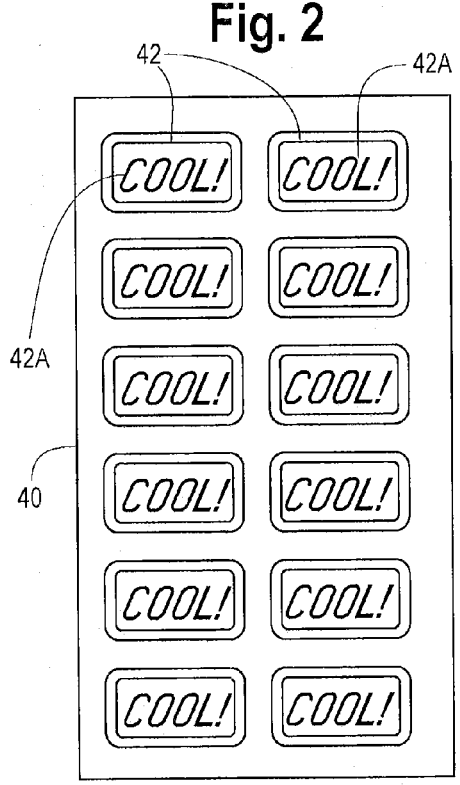
FIG. 2 is a top view of a packaged product in accordance with an embodiment of the present disclosure.

In an embodiment illustrated in FIG. 2, a packaged product 40 is provided that includes a plurality of compartments 44 with each compartment 44 containing an edible substrate 42. An edible ink indicia 42A is printed on the surface of each edible substrate 42, with the ink indicia 42A visible through at least portion of a panel 46 that at least partially defines a respective compartment 44. Further, the ink indicia 42A may contact an inner surface of the panel with substantially none of the ink indicia 42A adhering to the inner surface.

Figure 15:
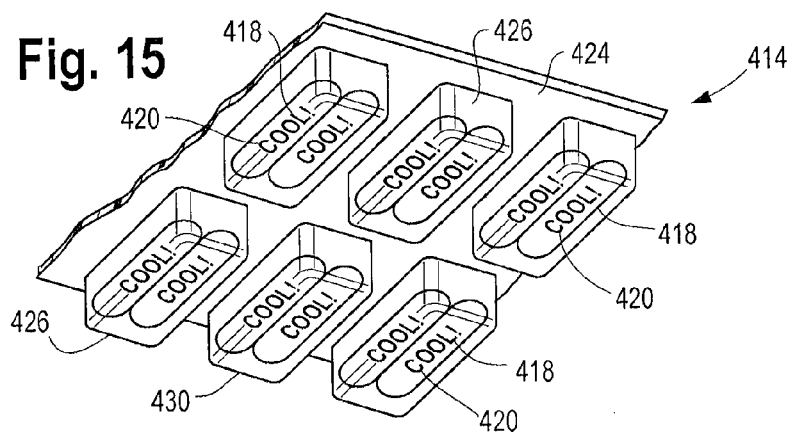
FIG. 15 is a fragmentary perspective view of a packaged product in accordance with an embodiment of the present disclosure.

In an alternative embodiment illustrated in FIG. 15, at least one compartment 426 contains at least two edible substrates, the ink indicia 420 of each edible substrate visible through at least one portion of the panel 430.

In an embodiment, edible substrate 42 may be any edible comestible, material, or substrate as previously discussed herein. Edible substrate 42 may have planar surfaces, non-planar surfaces, or a combination of planar and non-planar surfaces. Edible substrate 42 may have a flat, a curved, a wavy, a convex (i.e., pellet, tablet, or bean-shaped), or a concave surface contour. Moreover, edible substrate 42 may be a coated, uncoated, a chewing gum stick, a coated or uncoated chewing gum pellet, or combinations thereof. In an embodiment, edible substrate 42 may be a confectionery product as described above.

Ink indicia 42A may be any single color or multiple color edible ink or ink composition as discussed herein. 42A Moreover, ink indicia 42A may depict any symbol, object, alphanumeric representation, letter, word, text, shape, fanciful shape, image, graphic, color, advertising indicia, or combination thereof as desired. Non-limiting examples of suitable ink indicia include images, photographs or pictures of people, characters, scenes, or landscapes; advertising indicia such as brand names, trade names, logos, trademarks, text slogans; a processing code such as a bar code; words; objects; or any combination thereof. In an embodiment, ink indicia 42A may be an inkjet-indicia. Moreover, ink indicia 42A may be non-contact printed on edible substrate 42.

In an alternative embodiment, edible substrate 42 may include a first and second edible ink indicia on a surface of the edible substrate 42. Further, ink indicia 42A may include a plurality of ink indicia on the surface of the edible substrate 42. Even further, as will be discussed later with reference to FIG. 17, the first edible ink indicia may be on a first surface of the edible substrate 42 and the second edible ink indicia may be on a second surface of the edible substrate 42.

The packaged product 40 may also include an organoleptic component that corresponds to a feature. In other words, the organoleptic component may be any sensory component that may be associated with, or coordinated with, the feature. In particular, the organoleptic component may be any sensory-perceived component that typically accompanies, is associated with, complements, emphasizes, accentuates, highlights, matches, relates to, is in accord with, links with, or is connected to a feature. Non-limiting examples of suitable features include a word, an image, a color, a symbol, an object, an alpha-numeric representation, a letter, text, a shape, a fanciful shape, a symbol, a logo, a graphic, an advertising indicia, an indentation, a protrusion, and combinations thereof.

The organoleptic component may be any component that is perceptible by the senses. The organoleptic component may also be a component of the edible ink indicia. The organoleptic component may be any component that may be perceived or detected visually, by touch (i.e., by hand, tongue, or mouthfeel), audibly (sound), taste, and/or by smell (aromatic). Non-limiting examples of suitable organoleptic components include a flavoring agent, a cooling agent, a heating agent, a mouthfeel agent (a component with a rough, fizz, or particulate texture), a tingling agent (Jambu extract, Vanillyl alkyl ethers, Vanillyl n-butyl ether, spilanthol, Echinacea extract, Northern Prickly Ash extract, capsaicin, capsicum oleoresin, red pepper oleoresin, black pepper oleoresin, piperine, ginger oleoresin, gingerol, shoagol, cinnamon oleoresin, cassia oleoresin, cinnamic aldehyde, eugenol, cyclic acetal of vanillin, menthol glycerin ether, unsaturated amides and combinations thereof), a sweetening agent, a souring agent, a bittering agent, a teeth whitening agent, an anti-cavity agent, a breath freshening agent, an audible agent (a cracking, fizzing, or popping component), and combinations thereof.

In an embodiment, printer 32 may be used to form package 40 that includes adjacent edible substrates 42 having a uniform configuration as shown in FIG. 2. In this embodiment, adjacent edible substrates 42 have an identical configuration such that the printed edible ink indicia 42A of each edible substrate 42 appear identical to each other when viewed by a consumer. Further, each edible substrate 42 of a package 40 can have an identical configuration with respect to every edible substrate in the package 40. As discussed in detail below, uniform configuration may include, for example, an identical configuration, an opposite configuration, a portion of a multiple edible substrate design, a portion of a design encompassing all the edible substrates of the packaged product, or combinations thereof. Moreover, a uniform configuration may also include a first surface of the edible substrate having uniform orientation with respect to a second surface of the edible substrate.

Figure 3:
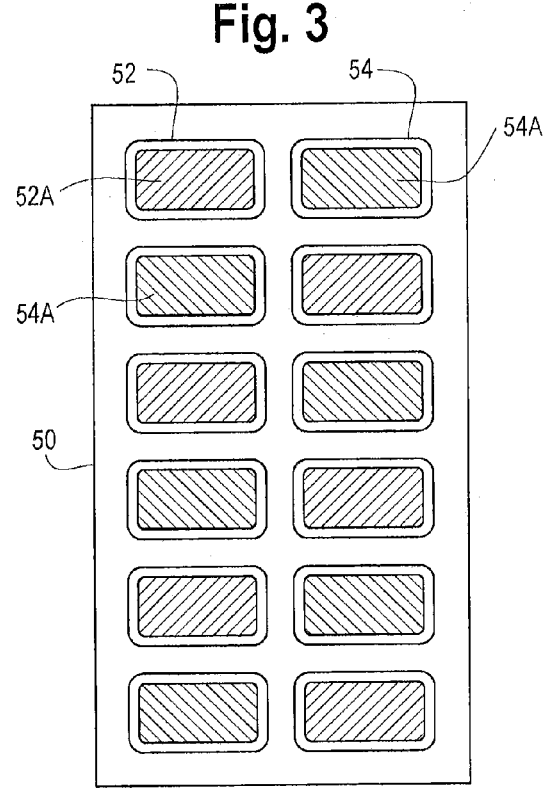
FIG. 3 is a top view of a packaged product in accordance with an embodiment of the present disclosure.

In an embodiment, printer 32 may be used to form package 50 that includes edible substrate 52 having an opposite configuration with respect to adjacent edible substrates 54, as shown in FIG. 3. In this embodiment, adjacent edible substrates 52 and 54 have an identical configuration such that the printed edible ink indicia 52A of edible substrate 52 appears to be a mirror image of the printed edible ink indicia 54A of edible substrates 54.

In an embodiment, printer 32 may be used to form package 60 that includes an edible substrate column 62 having an identical configuration with respect to adjacent edible substrate column 64, as shown in FIG. 4. In this embodiment, edible substrates 62A, 62B, 62C, 62D, 62E and 62F each include a respective printed edible ink indicia 63A, 63B, 63C, 63D, 63E and 63F that represent a portion of a larger column design 63. In FIG. 4, the column design 63 spells out the term "BREATH." Similarly, edible substrates 64A, 64B, 64C, 64D, 64E and 64F each include a respective printed edible ink indicia 65A, 65B, 65C, 65D, 65E and 65F that represent a portion of a larger column design 65. The column design 65 also spells out the term "BREATH." Alternatively, edible substrate columns 62 and 64 can have opposite or different configurations with respect to each other. For example, column design 63 can define a downward pointing arrow while column design 65 defines an upward forming arrow. Further, a multiple substrate design can include a row design whereby a row of edible substrates defines a respective design.

In an embodiment, printer 32 may be used to form package 70 that includes edible substrates 72 that, taken together, define one large design 74, as shown in FIG. 5. In this embodiment, each edible substrate 72 represents a portion of a design 74 encompassing all the edible substrates of the package 70. In FIG. 5, each edible substrate 72 includes an individual ink indicia that contributes to a shaded box design 74 encompassing all the edible substrates of the package 70.

In an embodiment, printer 32 may be used to form package 80 that includes an edible substrate 82 having a design on a first surface 82A having uniform configuration with respect to a design on a second surface 82B, as shown in FIG. 6. In this embodiment, first surface design 82A and second surface design 82B are configured such that each surface design represents a portion of a greater design spiral design encompassing the total of the two surfaces of edible substrate 82.

It should be understood that first surface design 82A and second surface design 82B can have any contemplated uniform configuration including, but not limited to, an identical configuration, an opposite configuration, a portion of a multiple edible substrate design, a portion of a design encompassing all the edible substrates of the packaged product, or combinations thereof. Moreover, with respect to FIGS. 2-6, the package involved can have any contemplated number and orientation of edible substrates in the package such that each and/or every edible substrate of the package can have uniform configuration with respect to a second surface of that respective substrate, an adjacent substrate, and/or every substrate of the package.

Figure 7:
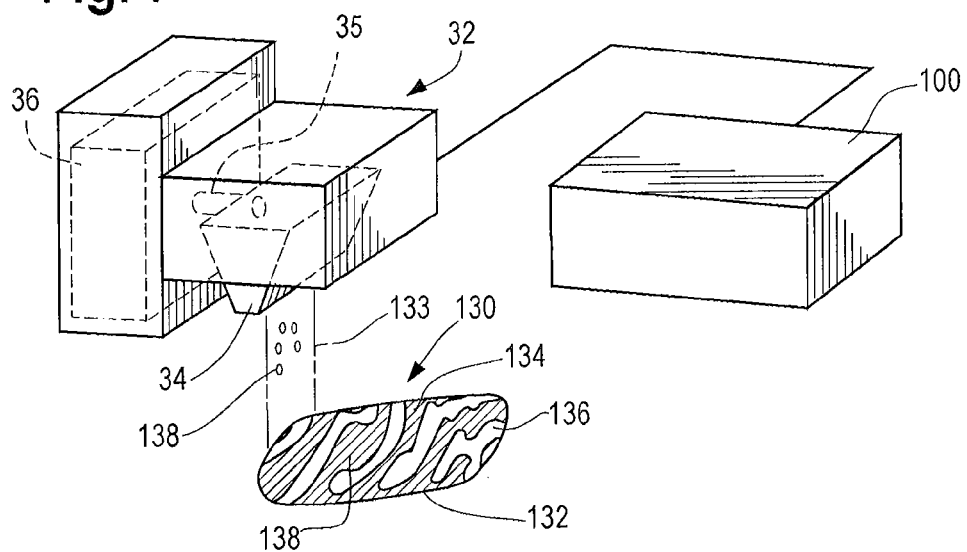
FIG. 7 is a perspective view of the printer printing on an edible substrate in accordance with an embodiment of the present disclosure.

In an embodiment, printer 32 (either alone or in conjunction with controller 100) may be used to prepare edible product 130 as shown in FIG. 7. Edible product 130 includes coated edible substrate 132. The coating of edible substrate 132 may be a hard or soft panned sugar or sugar-free coating. Pan coating entails applying successive layers of syrup to a center material, such as a confectionery or chewing gum material, and rotating and drying the material in a rotating pan. The coating may also be a wax or other hydrophobic material or protective material alone or in combination with the pan coating as is commonly known in the art. In an embodiment, coated edible substrate 132 may be a coated chewing gum pellet. Alternatively, edible substrate 132 may be a confectionery product, a coated edible substrate, an uncoated edible substrate, an edible substrate having a curved surface contour, a chewing gum stick, a chewing gum pellet, and combinations thereof.

Printer 32 may eject an ink component 133 onto the surface of coated edible substrate 132 to form ink indicia 134. Ink component 133 may include ingredients such as adhesion enhancers, wax and/or other components to promote adhesion to the surface of coated edible substrate 132. In an embodiment, printer 32 selectively jets ink component 133 onto discrete areas of coated edible substrate 132 to form ink indicia 134 having a feature 136 of a random pattern. An organoleptic component 138, which may or may not be an ingredient of ink component 133, may be dispensed by printer 32 onto the surface of coated edible substrate 132. Organoleptic component may also include ingredients such as adhesion enhancers, wax, and/or other components to promote and ensure adhesion of the organoleptic component to the surface of coated edible substrate 132. In an embodiment, organoleptic component 138 may be disposed on or otherwise contact ink indicia 134. Organoleptic component may correspond to or otherwise accentuate, enhance or highlight ink indicia 134. For example, ink indicia 134 may be a cool color such as blue or white and organoleptic component 138 may be a cooling agent. Alternatively, ink indicia 134 may be a hot color, such as red, and organoleptic component 138 may be a heating agent or a hot or spicy flavoring agent such as cinnamon.

One of ordinary skill in the art will appreciate the number of combinations between ink indicia, features and organoleptic components for the individual edible pieces, is limited only by one's imagination.

Figure 8:
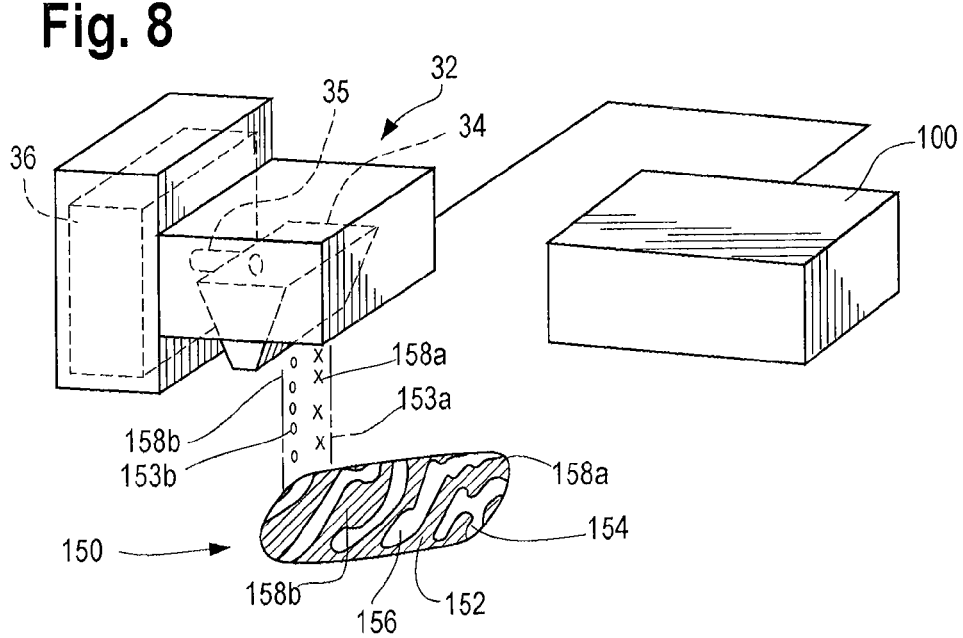
FIG. 8 is a perspective view of the printer printing on an edible substrate in accordance with an embodiment of the present disclosure.

In an embodiment, printer 32 may be used to form edible product 150 as shown in FIG. 8. Edible product 150 may include coated edible substrate 152 upon which printer 32 may selectively dispense first ink component 153a and second ink component 153b to form multicolor ink indicia 154. Ink indicia 154 may include a feature 156 that is a multicolored random pattern. Controller 100 may be used to cooperatively and selectively jet ink components 153a and 153b so as to cover substantially the entire surface of the coating. In an embodiment, feature 156 may be a random pattern of first ink composition 153a and a random pattern of second ink composition 153b, the ink compositions cooperatively ejected or in registration with each other so as not to contact the same portion of the coating surface. Alternatively, controller 100 and printer 32 may jet ink compositions 153a, 153b in an overlapping manner at discrete portions the coated surface to create select regions of a third color on the surface of coated edible substrate 152.

A first organoleptic component 158a may be selectively dispensed by printer 32 onto regions where first ink composition 153a is present. A second organoleptic component 158b may be selectively dispensed upon second ink composition 153b regions in a similar manner. In an embodiment, first organoleptic component 158a may be an ingredient of ink composition 153a and second organoleptic component 158b may be an ingredient of second ink composition 153b. Accordingly, each organoleptic component may be simultaneously dispensed its respective ink component.

In an embodiment, each organoleptic component corresponds to or otherwise accentuates the ink composition or feature with which it is associated. For example, first ink composition 153a may be a yellow color and first organoleptic component 158a may be a flavoring agent corresponding to yellow, such as a lemon flavoring agent, for example. Second ink composition 153b may be a clean color, such as white color and second organoleptic component 158b may have a clean or cleaning property such as breath freshening agent or a teeth whitening agent to accentuate the clean color. Edible product 150 provides a multiple colored coated edible product having a distinct surface characteristic and appearance. The multiple colored ink indicia with random pattern feature and a plurality of organoleptic components all disposed on the coated surface advantageously provides an attractive comestible product to consumers.

Figure 9:
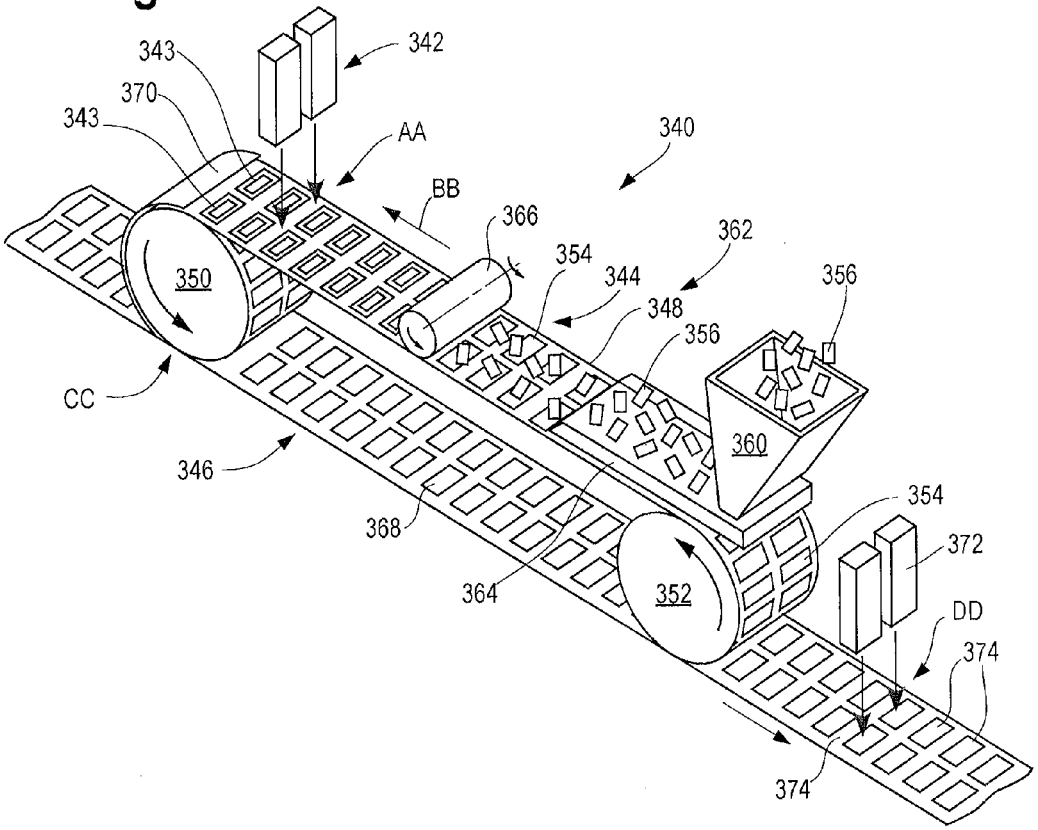
FIG. 9 is a fragmentary perspective view of a packaging apparatus in accordance with an embodiment of the present disclosure.
Figure 10:
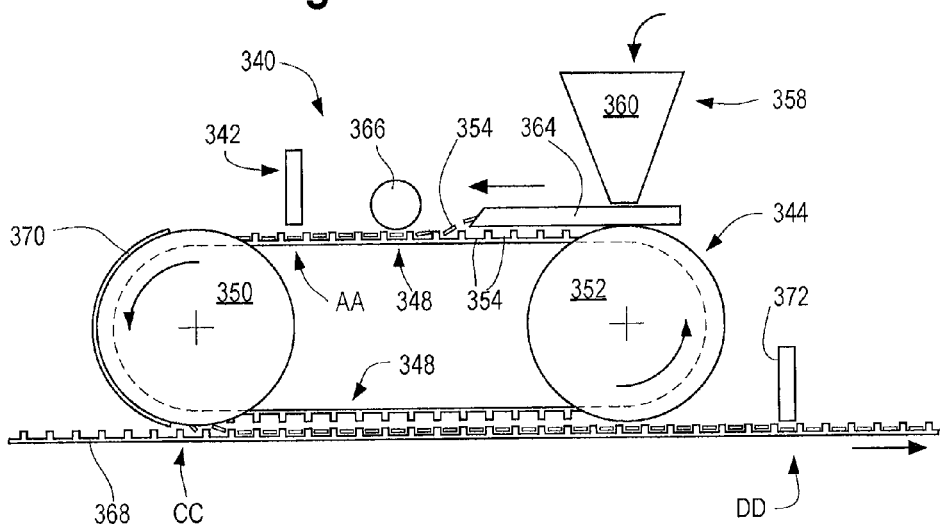
FIG. 10 is an elevation view of the apparatus of FIG. 9.

In an embodiment, a packaging apparatus 340 is provided as shown in FIGS. 9 and 10. Packaging apparatus 340 includes a printer 342, a carrier 344, and a package 346. Printer 342 may be any non-contact printer as previously discussed herein. In an embodiment, printer 342 may be any of the aforementioned ink-jet printers. Printer 342 may be located near or proximate to carrier 344 at a print position AA.

Carrier 344 may be a continuous conveyor and/or a rotatable drum. In an embodiment, carrier 344 may be a continuous conveyer and include a belt 348 in the form of a continuous loop, belt 348 extending around and between pulleys 350 and 352 as shown in FIGS. 9 and 10. One or both pulleys 350, 352 may be powered to drive otherwise move belt 348 continuously as indicated by arrow BB in FIG. 9. In an embodiment, carrier 344 may include pockets 354 in belt 348, pockets 354 adapted or otherwise configured to receive edible substrates 356 from feeder 358. Edible substrates 356 may be any edible substrate as previously described herein.

A feeder 358 may be located proximate to a portion of carrier 344. In other words, feeder 358 may be in operative communication with carrier 344 to feed, deliver, provide, or otherwise place edible substrates 356 into pockets 354. Feeder 358 may include a hopper 360 adapted to receive a plurality of edible substrates 356 and an alignment device 362. Alignment device 362 may receive the edible substrates from hopper 360 and place the edible substrates in the proper orientation, alignment, arrangement and configuration in order to fit in pockets 354. In an embodiment, alignment device 362 may include a vibration tray 364, a brush 366, or a combination thereof.

Carrier 344 may transport edible substrates 356 in the direction of arrow BB to print position AA. At print position AA, printer 342 may non-contact print an edible ink indicia on each of edible substrates 356. Printing may be continuous (carrier 344 moving edible substrate 356 to, through, and from print position AA as edible substrate receives the edible ink) or stationary (carrier 344 stops momentarily so that edible substrate 356 is stationary or otherwise not moving when receiving the edible ink). The edible ink indicia may be any ink indicia as described herein. In an embodiment, the ink indicia may cover 100% of the surface exposed to the printer 342, or from about 5% to about 95% of the surface, or from about 40% to about 60% of the surface exposed to the printer 342.

Once edible substrates have been printed upon, carrier 344 continues to move in the direction of arrow BB to transport edible substrates 356 to a discharge position CC as shown in FIGS. 9 and 10. In an embodiment, a transporter (such as a conveyor) transports package 346 to discharge position CC. In an embodiment, package 346 may be a package with a plurality of compartments 368, each compartment having a translucent or otherwise see-through panel as is commonly known in the art. Non-limiting examples of compartments include recesses, cups, blisters, or combinations thereof. At discharge position CC, pockets 354 move into cooperative alignment with package 346. In other words, at discharge position CC, each pocket 354 moves to a position directly above a respective compartment 368, each pocket 354 coming into registration with a respective compartment 368, edible substrate 356 moving from carrier 344 into a compartment 368 so that the ink indicia of each edible substrate is visible through the panel of each respective compartment. Each compartment may receive one or more than one edible substrate 356. In an embodiment the ink indicia of each edible substrate may be visible through a compartment panel.

In an embodiment, apparatus 340 may include a guide 370 as shown in FIGS. 9 and 10. Guide 370 may be located adjacent or proximate to carrier 344 so as to maintain or hold edible substrates 356 in pockets 354 until the edible substrates reach discharge position CC. One of ordinary skill in the art will appreciate that guide 370 prevents the edible substrates from falling out of pockets 354 due to gravity until each edible substrate 356 reaches discharge position CC.

In an embodiment, apparatus 340 may include a second printer 372 located at a second print position DD. Second printer 372 may be any printer as previously described herein. In an embodiment, second printer 372 may be a non-contact printer such as an ink-jet printer. A transporter (such as a conveyor) may move package 346 from discharge position CC to second print position DD. At print position DD, second printer 372 may print a second edible ink indicia 374 upon a second surface of the each edible substrate 356 disposed in respective compartments. Second ink indicia may be any ink indicia as described herein. Apparatus 340 may thereby produce an edible substrate with ink indicia on each side thereof and with the ink indicia of each edible substrate visible through the compartment panel.

In an embodiment, second ink indicia 374 may cover 100% of the second surface of the edible substrate, or from about 5% to about 95% of the second surface, or from about 40% to about 60% of the second surface. Thus, apparatus 340 advantageously provides printed edible substrates 356 having print (or ink indicia) on 100% of one or both sides of the edible substrate, or ink indicia covering from about 5% to about 95% of the surface area of one or both sides of the edible substrate, or ink indicia covering from about 40% to about 60% of the surface area of one or both sides of the edible substrate. In a further embodiment, the ink indicia may be a pattern (predetermined or random) that extends over the entire outer surface of the edible substrate 356. A controller may operatively connect non-contact printer 342 and second printer 372 to coordinate the printing of ink indicia 343, 374 on each side of the edible substrate 356. Consequently, apparatus 340 may produce a continuous pattern around the entire outer surface (i.e., on both sides) of the edible substrate.

A sealing device (located downstream of second printer 372) may apply a seal to package 346 to enclose the edible substrates in their respective compartments. Package 346 may be further processed (cut to desired size and/or packaged in a sleeve) as is commonly known in the art to produce any of the packaged products as shown in FIGS. 14-18, for example.

Figure 11:
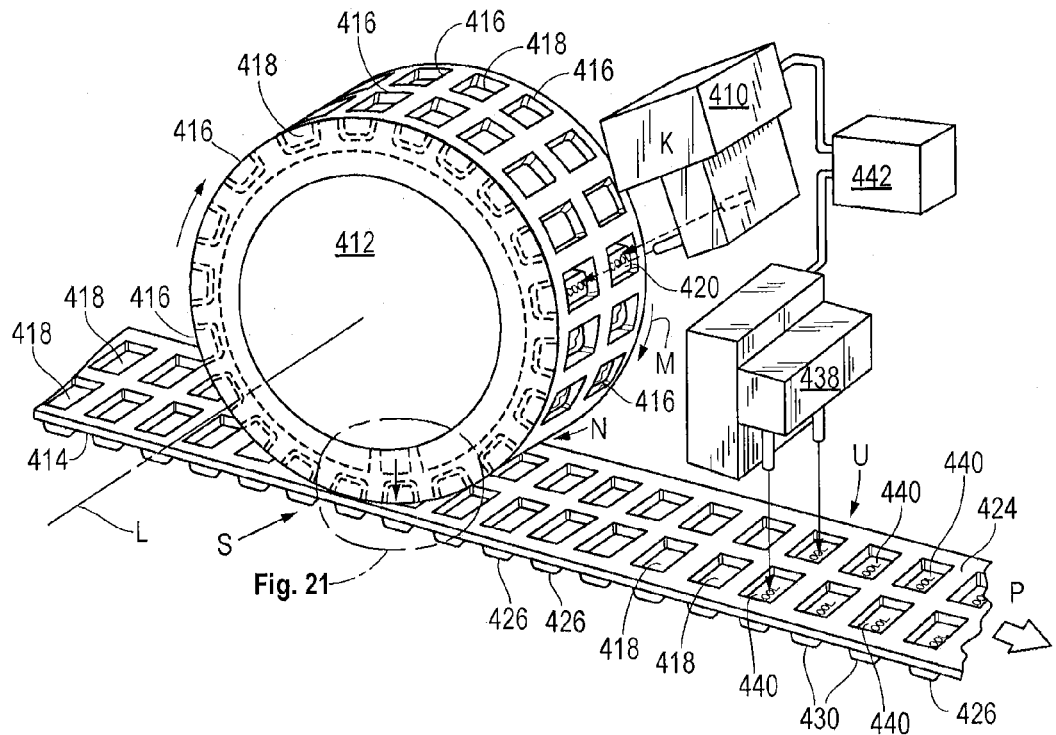
FIG. 11 is a fragmentary perspective view of a packaging apparatus in accordance with an embodiment of the present disclosure.
Figure 12:
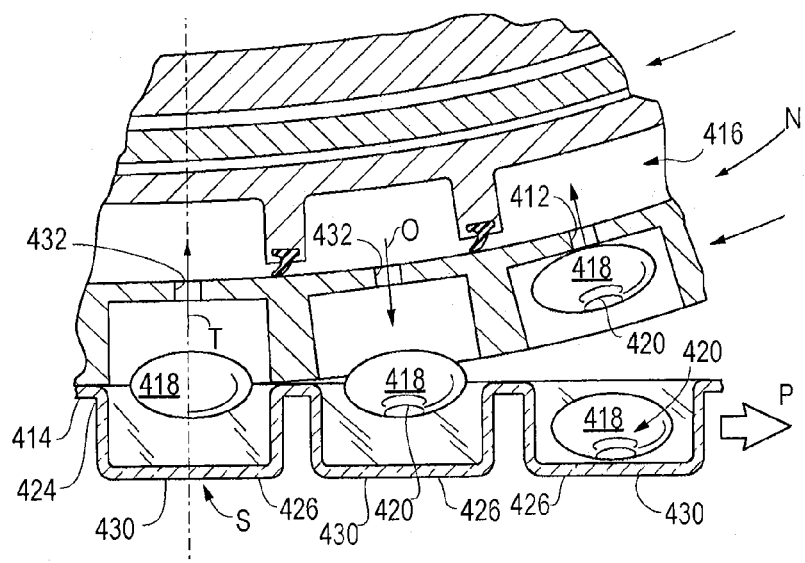
FIG. 12 is an enlarged fragmentary elevation view of area 21 of FIG. 11.
Figure 13:
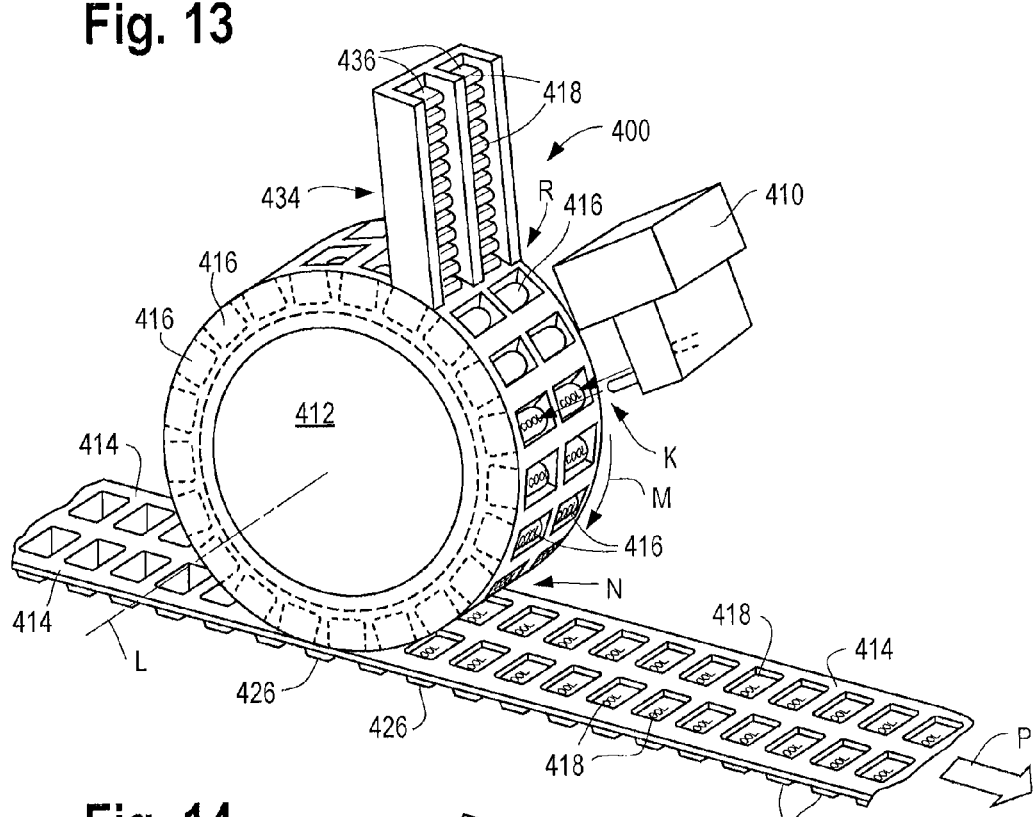
FIG. 13 is a fragmentary perspective view of a packaging apparatus in accordance with an embodiment of the present disclosure.

In an embodiment, a packaging apparatus 400 is provided as shown in FIGS. 11-13. Apparatus 400 includes a non-contact printer 410 and a carrier which may be a rotatable drum 412. A package 414 may be located below drum 412. Printer 410 may be any non-contact printer as previously discussed herein. In an embodiment, printer 410 may be any of the aforementioned ink-jet printers. Printer 410 may be positioned or otherwise located at a print position K as shown in FIGS. 9 and 10.

Rotatable drum 412 (or drum 412) is rotatable about axis L as shown in FIG. 9. Apparatus 400 may include a drive device (not shown) operatively connected to rotatable drum 412 in order to rotate the drum as is commonly known in the art. Rotatable drum 412 may be adapted to support one or more edible substrates 418 on an outer surface of the drum. In an embodiment, drum 412 includes a plurality of retaining members or pockets 416 that are located or otherwise disposed on or about the outer circumferential surface of the drum. Although FIGS. 11 and 13 show rotatable drum 412 with two rows of circumferential pockets 416, it is understood that the drum may be configured to have one row, two or more rows, five rows, ten or more rows or any number of circumferential rows therebetween. Pockets 416 may be considered as a plurality of retaining members or cavities on the outer surface of rotatable drum 412. Pockets 416 may be adapted or otherwise configured to hold or contain one or more edible substrates 418. In an embodiment, each pocket 416 may be adapted to contain one edible substrate. Edible substrate 418 may be any edible material or comestible as previously discussed herein. In an embodiment, edible substrate 418 may be a confectionery material. In a further embodiment, edible substrate 418 may be a chewing gum. In yet a further embodiment, edible substrate 418 may be a coated chewing gum pellet.

Rotatable drum 412 may be located near or otherwise proximate to printer 410. Rotatable drum 412 rotates to move edible substrates 418 retained in pockets 416 to print position K. At print position K, printer 410 non-contact prints an edible ink onto a surface of each edible substrate 418, thereby forming an edible ink indicia 420 on the edible substrate. The ink that forms ink indicia 420 may be any ink as previously discussed herein. Apparatus 400 may be configured to stop rotatable drum 412 during the printing of ink indicia 420. Alternatively, rotation of drum 412 may be continuous, or varied (increased or decreased rotation rate as desired) during the printing of ink indicia 420. The contact angle between the edible substrate and the non-contact printer may be greater than zero to 90° or any angle therebetween.

Ink indicia 420 may be any ink indicia as discussed herein. In an embodiment, ink indicia 420 may be a non-contact printed ink indicia. A non-limiting example of a non-contact ink indicia may be an ink-jet indicia. The ink of a non-contact ink indicia may be uniformly dispersed throughout the entire indicia. Non-contact ink indicia are thereby advantageously applied to substrates having curved surfaces. The non-contact printer eject jets of ink onto a curved (or flat) substrate, the density of the ink for the resulting ink indicia being consistent or uniform regardless of the varying distances between the non-contact printer and the substrate curved surface. Upon visual examination, a non-contact printed ink indicia may also exhibit printing pinstrips or small or very fine dots of ejected ink (i.e., 75-500 dpi)—a characteristic absent in contact printed ink indicia, for example. In an embodiment, ink indicia 420 may be any word, image, color, symbol, object, alpha-numeric representation, letter, text, shape, symbol, logo, graphic representation, advertising indicia, or any combinations thereof as previously described. In an embodiment, ink indicia 420 may include a feature and an organoleptic component corresponding to the feature as herein discussed.

Figure 14:
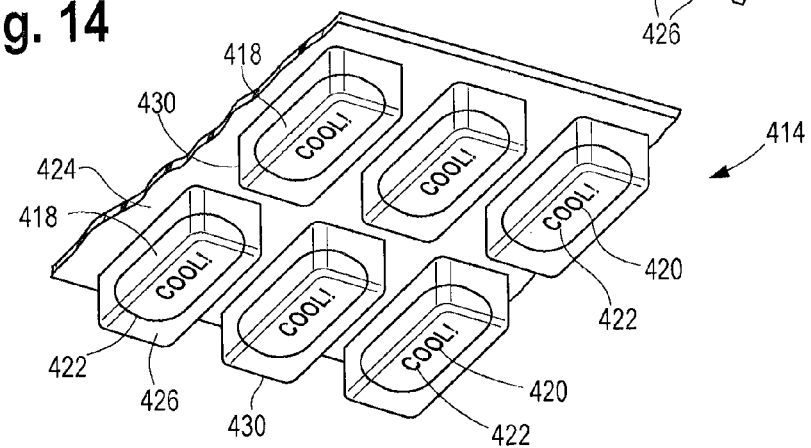
FIG. 14 is a fragmentary perspective view of a packaged product in accordance with an embodiment of the present disclosure
Figure 18:
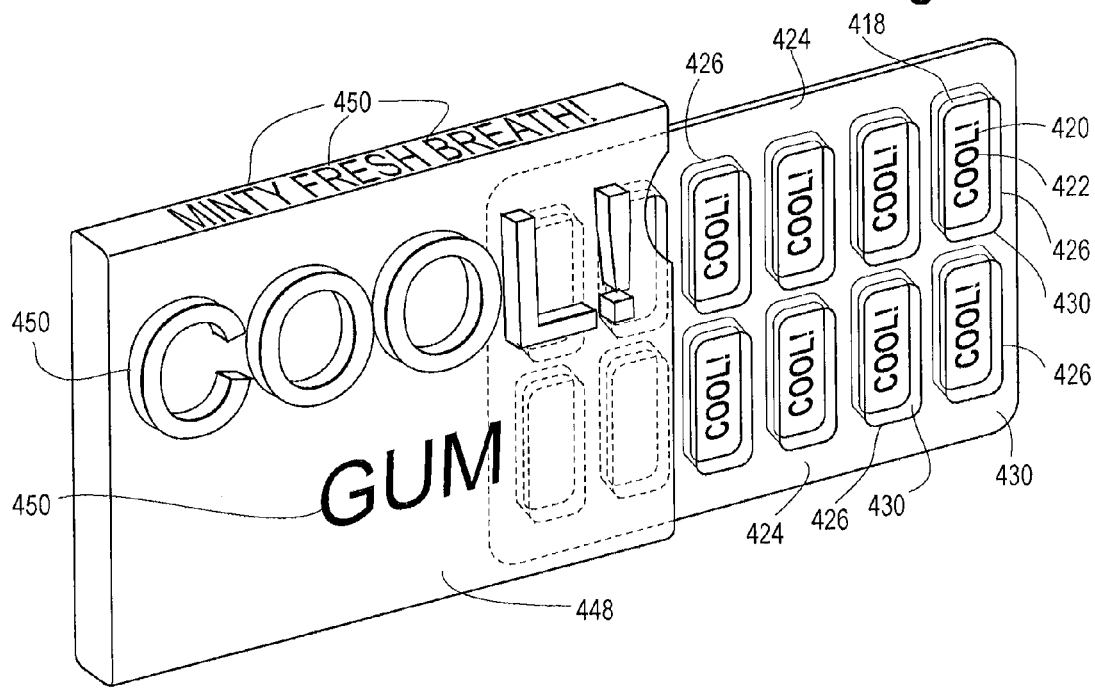
FIG. 18 is a perspective view of a packaged product in accordance with an embodiment of the present disclosure.

For example, as exemplified in FIGS. 14 and 18, ink indicia 420 may include feature 422 that may be a word (i.e., "Cool!") with a double meaning (a cool tasting flavor, or the consuming of the edible substrate is "cool," or first rate, excellent, or otherwise socially acceptable), with the ink indicia including a cooling agent that corresponds to the word (i.e., the cooling agent provides a cool mouthfeel when the consumer consumes the edible substrate, providing the consumer with confidence, the feeling of being appealing to others, and socially acceptable—the aura of being "cool.")

In an embodiment, the ink used to form ink indicia 420 may be a fast-drying ink as is commonly known in the art. Upon contact of the ink with the surface of the edible substrate, ink indicia 420 may dry in about 0.01 seconds to about 20 seconds or in about 1 second to about 10 seconds or any time value therebetween. In an embodiment, ink indicia 420 may dry in less than one second. In a further embodiment, rotatable drum 412 may place edible substrate 418 into a respective compartment 426 within about 0.01 seconds to about 60 seconds after the printing.

Figure 16:
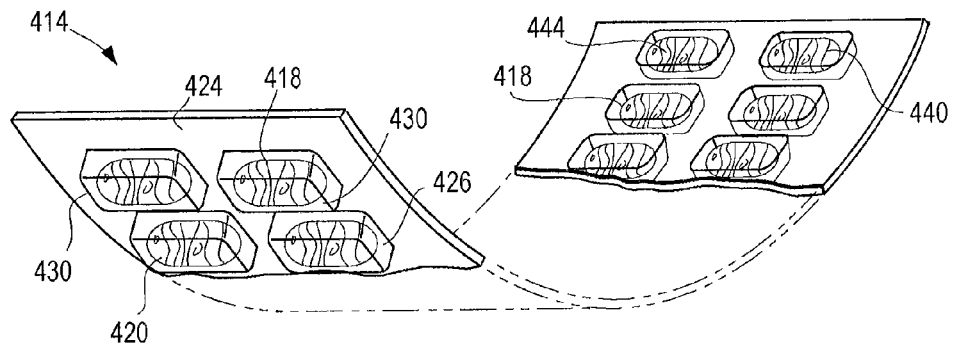
FIG. 16 is a fragmentary perspective view of a packaged product in accordance with an embodiment of the present disclosure
Figure 17:
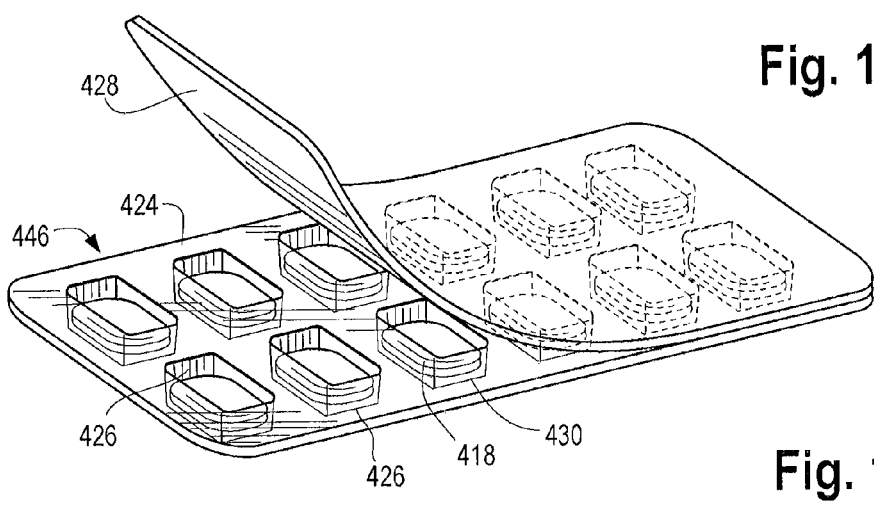
FIG. 17 is a perspective view of a packaged product in accordance with an embodiment of the present disclosure

Located below rotatable drum 412 is a package. The package may be any suitable package having one or more compartments for holding, storing or otherwise containing one or more edible substrates 418 as is commonly known in the art. In an embodiment, the package may be a package 414 (also known as a compartment pack, blister pack or a push-through pack) as shown in FIGS. 14-18. Package 414 may include a base portion 424, and one or more compartments 426, and a seal 428 (FIG. 17). Non-limiting examples of compartments may include recesses, cups, or compartments. Non-limiting examples of suitable materials for base portion 424 may include polymeric material and polymeric composite. Non-limiting examples of suitable materials for seal 428 may be include a polymeric material, a polymeric composite, a metal foil, aluminum foil, metallized film, polyethylene, paper, polycoated paperboard, or any other material providing suitable barrier. Compartments 426 may be thermoformed by heating base portion 424 and forming the compartments with a vacuum apparatus as is commonly known in the art. Each compartment 426 may include a panel 430. In an embodiment, each compartment and/or panel may be transparent, translucent, or otherwise see-through, permitting the consumer to view edible substrate 418 through panel 430. It is understood that panel 430 may be considered a front panel as seal 428 may form the rear or back panel of the package as is commonly known in the art.

Each compartment 426 may contain one or more individual comestible items. Manually pressing the compartment and pushing the tablet/pellet through the seal may remove the tablet or pellet comestible. Packages of the present disclosure are typically slim, lightweight and the compartments may be adapted to hold various size tablets or pellet-shaped comestible objects.

In an embodiment, a transporter (not shown), such as a conveyor, moves a continuous package in a direction lateral to the drum as indicated by arrow P and also in a contrary motion to drum rotation. This enables package 414 to continuously receive edible substrates 418 into compartment 426 as the compartments move past rotatable drum 412. Package 414 may be cut and shaped into discrete, individual packages downstream of rotatable drum 412 as will be described below.

Once ink indicia 420 is imprinted upon edible substrate 418, rotatable drum 412 rotates in the direction of arrow M to deliver or otherwise transport edible substrates 418 to a discharge position N, position N being proximate to and above package 414. As rotation of drum 412 proceeds, gravity pulls edible substrate 418 from pocket 416. Placement of package 414 may be coordinated with the position of drum 412 such that when edible substrate 418 falls or otherwise drops from retaining member 416, a compartment 426 is positioned to receive or immediately receive the falling edible substrate. In an embodiment, package 414 and rotatable drum 412 may be coordinately aligned with each other so that edible substrate 418 may be placed in compartment 426 with ink indicia 420 visible through panel 430. In other words, at discharge position N, edible substrate 418 falls from pocket 416 into compartment 426 so that ink indicia 420 contacts the inner surface of panel 430. Moving between print position K and discharge position N, rotatable drum 412 thereby inverts or otherwise flips the edible substrates 418 into respective compartments 426 to ensure ink indicia 420 is visible through panel 430. Thus, the surface upon which the ink indicia is printed is inverted or flipped when placed into the compartment. By printing the ink indicia onto the edible substrate immediately prior to placing the edible substrate in the package, apparatus 400 advantageously reduces or eliminates smudging of the ink indicia that typically occurs from handling or substrates rubbing together.

In an embodiment, each compartment 426 of package 414 may contain at least one edible substrate 418 with the ink indicia of each edible substrate visible through each respective panel 430 as shown in FIG. 14. In a further embodiment, each compartment 426 may contain more than one edible substrate, with the ink indicia for each edible substrate in the compartment visible or otherwise viewable through the panel of the compartment. In yet a further embodiment, each compartment 426 may hold two edible substrates 418, with ink indicia 420 of each edible substrate visible through panel 430 of the respective compartment 426, as shown in FIG. 15.

In a further embodiment, ink indicia 420 may be dry or completely dry when edible substrate 418 lands or otherwise arrives in compartment 426. This ensures that the ink indicia remains intact and adheres to the edible substrate surface while edible substrate 418 remains in the compartment. In other words, the ink dries before edible substrate 418 is discharged into compartment 426 such that none or substantially none of ink indicia 420 adheres to the inner surface of panel 430.

FIG. 12 illustrates an enlarged fragmentary view of an embodiment wherein each pocket 416 includes an orifice 432. Orifice 432 may be in operative communication with a retainer such as a pressurizer (not shown) as is commonly known in the art. The pressurizer may or may not be a component of rotatable drum 412. The pressurizer may provide a negative pressure (i.e., a vacuum) to secure or retain edible substrate 418 in retaining member 416. This advantageously maintains edible substrate 418 in a stationary or otherwise motionless, non-moving state when ink indicia 420 is applied to the edible substrate surface, yielding a high resolution, well-defined ink indicia.

The negative pressure provided through orifice 432 may also advantageously enable retention of edible substrate 418 within pocket 416 for a longer period through the rotation cycle of rotatable drum 412. In other words, orifice 432 permits pocket 416 to hold edible substrate 418 beyond the point in which gravity would cause the edible substrate 418 to fall from rotatable drum 412. When pocket 416 is located directly above (or nearly directly above or substantially directly above) compartment 426 (as shown in FIG. 12), the negative pressure from the pressurizer imparted upon edible substrate 418 through orifice 432 may be terminated, permitting edible substrate 418 to fall or drop into compartment 426, with ink indicia 420 contacting the inner surface of panel 430. The short distance traveled by edible substrate 418 between retaining member 416 the compartment 426 ensures that each edible substrate arrives in a respective compartment with ink indicia 420 face down, ink indicia 420 contacting the inner surface of panel 430. This correspondingly ensures that the ink indicia is visible or otherwise viewable through panel 430. In a further embodiment, the pressurizer may provide a positive pressure to push or otherwise eject edible substrate 418 from pocket 416 and into compartment 426 as indicated by arrow O in FIG. 12. Pressurizer may impart pressure by way of any fluid (liquid or gas) as is commonly known in the art. Non-limiting examples of suitable fluids for use with the pressurizer include air, nitrogen, a noble gas, and carbon dioxide, for example.

In an embodiment, apparatus 400 may include a feeder 434 as shown in FIG. 13. Feeder 434 may be located next to or otherwise proximate to rotatable drum 412 and may include one or more channels 436 through which edible substrates 418 may be delivered to respective pockets 416. Feeder 434 may be located, disposed or otherwise positioned anywhere along the outer circumference of rotatable drum 412 in order to deliver one or more edible substrates 418 to a load position R. Load position R may accordingly be located at any point on the circumference of rotatable drum 412. At load position R, edible substrates 418 move from channels 436 into respective pockets 416. The pressurizer may or may not deliver a negative pressure through orifices 432 in order to load the edible substrates into respective pockets 416. Feeder 434 may be in operative communication with a source (not shown) of edible substrates, the source providing edible substrates into channels 436. Non-limiting examples of suitable edible substrate sources include a bin, a hopper, or the like as is commonly known in the art.

In an embodiment, edible substrates 418 may be fed or delivered to compartments 426 upstream of drum 412 or otherwise prior to each compartment arriving proximate to rotatable drum 412 as shown in FIG. 11. The placement of edible substrates into compartments 426 may be accomplished by any suitable manner as is commonly known in the art. A transporter (such as a conveyor) may move edible substrate-containing compartments 426 to a load position S as shown in FIGS. 11 and 12. At load position S, the pressurizer may deliver a negative pressure through orifice 432, the negative pressure having sufficient strength to lift edible substrate 418 from compartment 426 into a respective retaining member 416 as shown by arrow T in FIG. 12. Rotatable drum 412 and package 414 may be configured and arranged such that pockets 416 may continuously align with or may otherwise be cooperatively oriented with compartments 426 as the transporter continuously moves edible substrate-containing compartments 426 to load position S. With each pocket 416 loaded with an edible substrate 418, rotatable drum 412 may rotate to move the edible substrate to print position K and to discharge position N. One of ordinary skill in the art will appreciate that load position S is upstream of discharge position N.

In this embodiment, package 414 may serve or otherwise function as a feeder. After being loaded into retaining members 416 and being printed upon at print position K, rotatable drum 412 may move edible substrates 418 to discharge position N. At discharge position N, edible substrates 418 may be placed into compartments 426 as previously discussed. The compartment into which each respective edible substrate may be placed at discharge position N may or may not be the same compartment that held the edible substrate at load position S.

In an embodiment, a second printer 438 may be located at a second print position U as shown in FIG. 11. Second printer 438 may print a second edible ink indicia 440 onto edible substrate 418. Non-contact printer 410 and second printer 438 may be the same or different. Second printer 438 may be a contact printer or a non-contact printer. In an embodiment, second printer 438 may be a non-contact printer such as any ink-jet printer as discussed herein. Second ink indicia 440 may be any ink indicia as previously discussed herein. Thus, ink indicia 440 may include a feature and/or an organoleptic component. Ink indicia 420 and second ink indicia 440 may be the same or different.

Second printer 438 may be located anywhere along apparatus 400 to print ink indicia 440 (upstream of rotatable drum 412, proximate to rotatable drum 412, downstream of rotatable drum 412) onto any surface of edible substrate 418 as desired. For example, second printer 438 may be located upstream of rotatable drum 412 to print ink indicia 440 on one side of the edible substrate with ink indicia 420 printed on another side of the edible substrate. Ink indicia 420 and 440 may be located on the same side of edible substrate 418. Ink indicia may overlap each other—either fully or partially. Alternatively, ink indicia 420 and 440 may be located on different sides of edible substrate 418.

In an embodiment, second printer 438 may be located downstream of rotatable drum 412 to print second ink indicia 440 on a different side than ink indicia 420 as shown in FIG. 11. Thus, ink indicia 440 may be printed on an opposing side of edible substrate 418 with respect to the side upon which ink indicia 420 is printed. In a further embodiment, second ink indicia 440 may be the same as ink indicia 420 (i.e., the word "Cool!"). The ink from which ink indicia 440 is formed may or may not be the same ink used to form ink indicia 420. In an embodiment, ink indicia 440 may be a fast-drying ink as previously discussed. Ink indicia 440 may be proximate to or otherwise contact the inner surface of seal 428 when package 414 is sealed or otherwise closed. In an embodiment, none or substantially none of ink indicia 440 adheres to the inner surface of seal 428. Thus, ink indicia 440 may be proximate to seal 428, ink indicia 420 being distal to seal 428. Seal 428 may or may not be transparent. In an embodiment, seal 428 may be transparent permitting second ink indicia 440 to be viewed therethrough.

In an embodiment, non-contact printer 410 may be operatively connected to second printer 438. For example, a controller 442 may operatively connect non-contact printer 410 and second printer 438. Controller 442 may coordinate the print parameters for the non-contact printer 410 and second printer 438 to vary the properties of ink indicia 420, 440 as desired and as is commonly known in the art. In an embodiment, controller 442 may coordinate non-contact printer 410 and second printer 438 to print a pattern 444 on the outer surface of edible substrate 418 as shown in FIG. 16. Pattern 444 may be the combination of ink indicia 420 on a first side of edible substrate 418 and ink indicia 440 on a second side of edible substrate 418. Pattern 444 may be random or predetermined as desired. Controller 442 may coordinate the printing of non-contact printer 410 and second printer 438 so that second ink indicia 440 blends smoothly into or with the ends or edges of ink indicia 420. Thus, ink indicia 420 on a first side of the edible substrate may be aligned with or otherwise coordinated with ink indicia 440 located on a second side of the ink indicia. In other words, controller 442 may coordinate the printing to provide a continuous or seamless pattern 444 of edible ink indicia about the outer surface of edible substrate 418.

In an embodiment, package 414 may be cut into discrete packets 446 with a cutting device as is commonly known in the art and shown in FIGS. 17 and 18. Packet 446 may contain any number of comestible containing compartments 426 as desired. In an embodiment, packet 446 contains from about 4 to about 20 compartments, or about 8 to about 12 compartments, or any number of compartments therebetween. In an embodiment, each compartment 426 contains at least one edible substrate 418 with an edible ink indicia 420. The ink indicia of each edible substrate may be visible or otherwise viewable through panel 430 of each respective compartment 426. Seal 428 may be applied to package 414 or to packet 446 to enclose edible substrates 418 in respective compartments 426 as is commonly known in the art. Packet 446 may then be placed into a sleeve 448, sleeve 448 providing protection to packet 446 and a medium upon which advertising 450 may be placed as is commonly known in the art.

Figure 19:
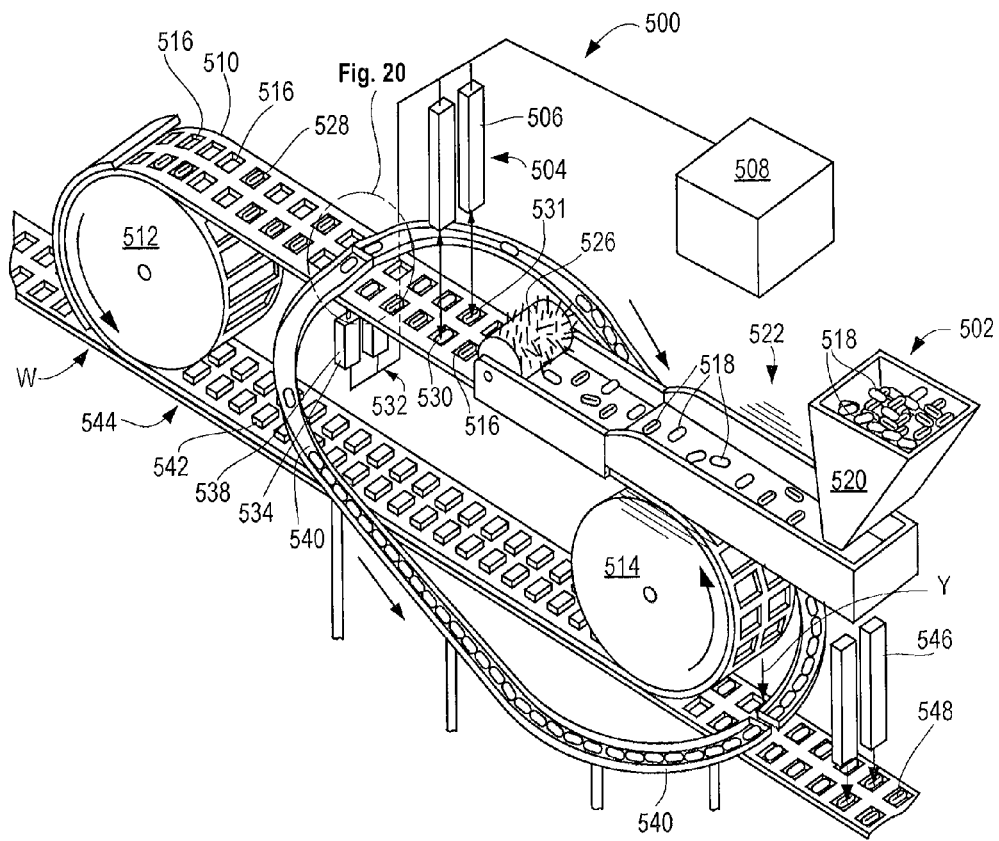
FIG. 19 is a perspective view of a packaging apparatus in accordance with an embodiment of the present disclosure.
Figure 20:
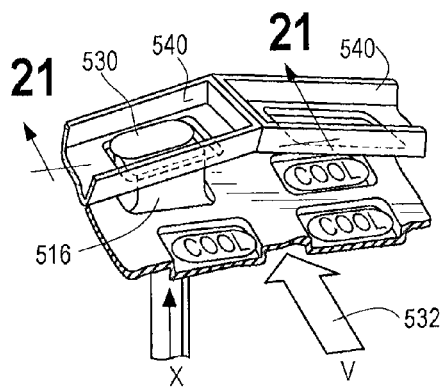
FIG. 20 is an enlarged fragmentary perspective view of an extractor of FIG. 19.
Figure 21:
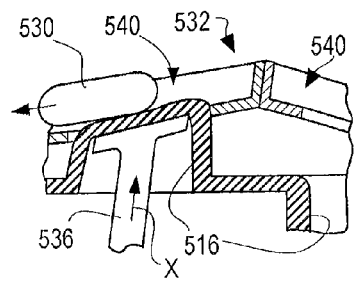
FIG. 21 is a sectional view taken along direction arrow V of FIG. 20.

In an embodiment, a packaging apparatus 500 is provided as shown in FIGS. 19-21. Packaging apparatus 500 includes a feeder 502, a carrier 504, a detector 506, and a controller 508. Carrier 504 may be any continuous carrier or conveyor as described herein. Carrier 504 may include a belt 510 in the form of a continuous loop, belt 510 extending around and between pulleys 512 and 514. Belt 510 may include a plurality of pockets 516 configured or otherwise adapted to receive edible substrates 518 therein.

Feeder 502, in operative communication with carrier 504, receives a plurality of edible substrates 518 and delivers an edible substrate to each pocket 516 as carrier 504 continuously moves thereunder. In an embodiment, feeder 502 may include a hopper 520 and an alignment device 522. Alignment device 522 may include a vibration tray 524, a brush 526 or a combination thereof. Alignment device may properly align, configure, and/or place each edible substrate in a respective pocket 516 as previously discussed.

In an embodiment, each edible substrate 518 may have more than one side, each edible substrate having an ink indicia 528 on a single side. In other words, the edible substrates may have been subjected to a printing procedure prior to being received by feeder 502. The ink indicia may be any ink indicia as described herein. In an embodiment, the ink indicia may be an ink-jet indicia. In an embodiment, each edible substrate may have two sides. Non-limiting examples of edible substrates having two sides include edible substrates in stick form and/or edible substrates in pellet form. Thus, one of ordinary skill in the art will appreciate that the edible substrates may be delivered to pockets 516 in a number of ways. For example, feeder 502 (and/or alignment device 522) may deliver an edible substrate so that ink indicia 528 is present or otherwise disposed on an exposed surface of the edible substrate when the edible substrate is in a pocket 516. Alternatively, the edible substrate may end up in pocket 516 with the ink indicia facing downward, in contact with the surface of pocket 516. When this occurs, the ink indicia is on an unexposed surface of the edible substrate upon delivery of the edible substrate into a pocket. Thus, an edible substrate is a misoriented edible substrate when it is delivered to a pocket with the ink indicia unexposed. In other words, a misoriented edible substrate is an edible substrate disposed in a pocket such that the ink indicia is in contact with the pocket surface or the ink indicia is otherwise not visible when the edible substrate is in the pocket. A misoriented edible substrate 530 and a properly oriented edible substrate 531 with ink indicia 528 on the exposed substrate surface are shown in FIG. 28.

Pulleys 512, 514 continuously move pockets 516 containing an edible substrate therein away from feeder 502 as shown by direction arrows V. Detector 506 may be located proximate to carrier 504, downstream of feeder 502. Detector 506 may be any detector adapted to or otherwise capable of detecting or sensing the absence and/or presence of ink indicia 528 on the exposed surface of edible substrate 518. In other words, detector 506 may be adapted and/or configured to detect a misoriented edible substrate 530 as pockets 516 move or otherwise pass by the detector.

In an embodiment, the edible substrate 518 may have a first side of a first color and a second side of a second color. A non-limiting example of such an edible substrate may include a pressed tablet confection composed of two different confections, each confection having a different color. Detector 506 may be configured or otherwise adapted to detect the presence or absence of either color.

Controller 508 may be placed in operative communication with detector 506. In addition, controller 508 may also be placed in operative communication with an extractor 532. When detector 506 detects the presence of a misoriented edible substrate 530 (or the presence of a predetermined color), the detector sends a signal to controller 508. Controller 506 then directs extractor 532 to remove the misoriented edible substrate from the pocket.

Carrier 504 may then transport the properly oriented edible substrates 531 remaining in pockets 516 to a discharge position W. At discharge position W, pockets 516 are inverted and also placed in cooperative registration with respective compartments 542 of a package 544 so that each properly oriented edible substrate 531 moves from the carrier and into a respective compartment and the ink indicia is visible through the compartment panel as previously discussed.

Extractor 532 may be any device adapted to, configured, and/or capable of removing an edible substrate from a pocket 516. Non-limiting examples of suitable extractors include a suction device, a movable gate or arm, an ejection device, or the like. In an embodiment, extractor 532 may include an ejection device 534 as shown in FIGS. 19-21. It is understood that when the extractor is an ejection device, belt 510 may be made of a resilient, flexible material such as natural or synthetic rubber or elastomer. Ejection device 534 may include a finger 536 and a drive mechanism 538 in operative communication with controller 508. Upon direction of controller 508, drive mechanism 538 drives or otherwise propels finger 536 upward (as indicated by direction arrow X in FIGS. 20 and 21), finger 536 contacting the underside of pocket 516 to push, eject, remove, force, or otherwise thrust misoriented edible substrate 530 from the pocket. Once misoriented edible substrate 530 has vacated pocket 516, finger 536 may return to a non-extended position, with pocket 516 returning to its original shape and/or configuration.

In an embodiment, the removed misoriented edible substrate 530 may be received by a recycle device 540. Recycle device 540 may be any device capable of receiving or otherwise collecting the misoriented edible substrates removed from carrier 504. Non-limiting examples of suitable recycle devices include a container, a hopper, a tray, a ramp, a slide, a plate, a bin, and combinations thereof. In an embodiment, the collected misoriented edible substrates may be returned to feeder 502 for further processing.

In an embodiment, recycle device 540 may include a ramp that delivers misoriented edible substrate 530 to a second discharge position Y. Second discharge position Y may be downstream of discharge position W. Recycle device 540 may place misoriented edible substrate 530 directly over package 544. It is understood that package 544 may be the same package that received edible substrates from carrier 504 at discharge position W. Thus, as movement of package 540 places an empty compartment under misoriented edible substrate 530 at second discharge position Y, misoriented edible substrate 530 may move into the empty compartment so that the ink indicia contacts the inner surface of the compartment panel. It is noted that at second discharge position Y, misoriented edible substrate 530 is so arranged and positioned to place ink indicia 528 (i.e., ink indicia facing downward) in contact with the inner surface of the compartment panel. Consequently, directly downstream of second discharge position Y, each compartment 542 contains an edible substrate, the ink indicia of each edible substrate visible through the compartment panel. In other words, directly downstream of second discharge position Y, it is not possible to distinguish between misoriented edible substrates and properly oriented edible substrates in the compartments 542. Apparatus 500 thereby produces a package with an edible substrate in each compartment 542, each edible substrate having an ink indicia visible through the compartment panel.

In an embodiment, apparatus 500 may include a dispensing device (not shown) at second discharge position Y to dispense the removed (i.e., misoriented edible substrates) edible substrates into the compartments 542 of package 544 as is commonly known in the art. Consequently, misoriented edible substrates 530 may be placed into compartments 542 by way of gravity (as described above) or mechanically by way of the dispensing device.

In an embodiment, apparatus 500 may include a printer 546 located downstream of second discharge position Y. Printer 546 may be any printer as described herein. Printer 546 may print a second ink indicia 548 on a second side of each edible substrate 518. Apparatus 500 may include a sealing device to place a seal on package 544 as discussed herein to produce any packaged product as shown in FIGS. 14-18, for example.

Figure 22:
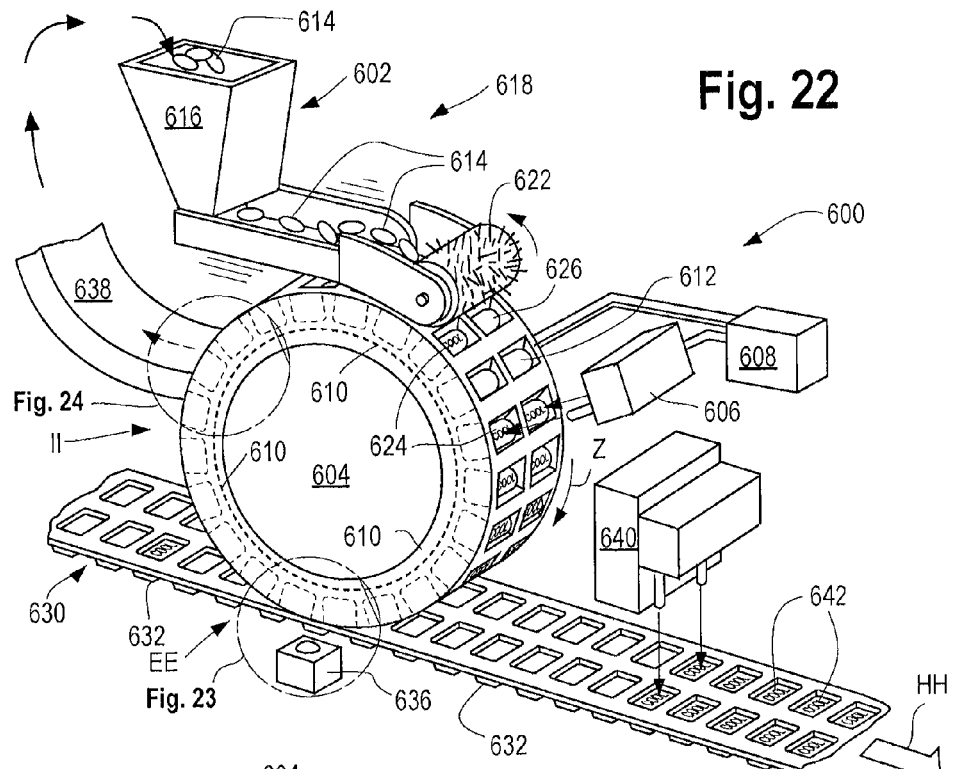
FIG. 22 is a fragmentary perspective view of a packaging apparatus in accordance with an embodiment of the present disclosure.
Figure 23:
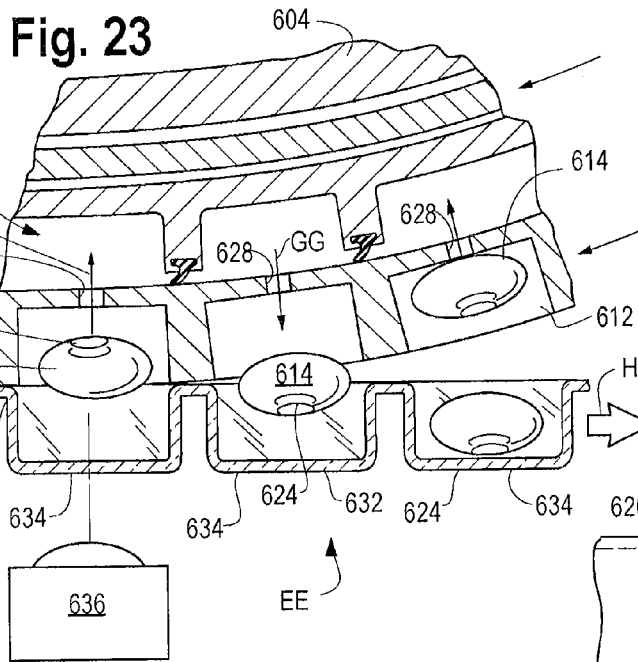
FIG. 23 is an enlarged elevation view of area EE of FIG. 22.
Figure 24:
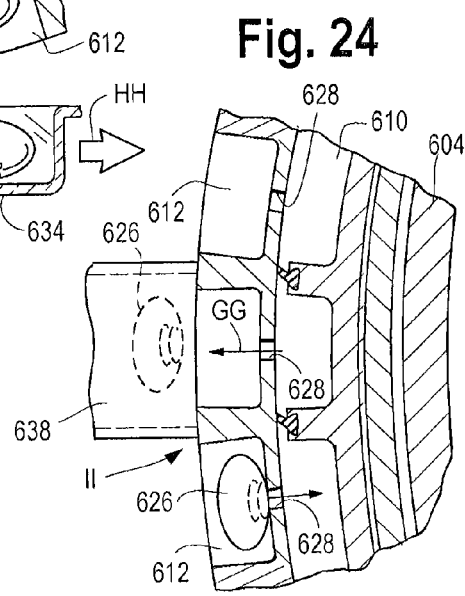
FIG. 24 is an enlarged elevation view of area II of FIG. 22.

In an embodiment, a packaging apparatus 600 is provided as shown in FIGS. 22-24. Packaging apparatus 600 may or may not be a component of apparatus 10. Packaging apparatus 600 includes a feeder 602, a carrier such as a rotatable drum 604, a detector 606, a controller 608, and a retainer 610. Rotatable drum 604 has an outer circumferential surface with a plurality of pockets 612 disposed thereon. Feeder 602 is proximate to and in operative communication with rotatable drum 604. Feeder 602 receives a plurality of edible substrates 614 and continuously delivers an edible substrate 614 to each pocket 612. Rotatable drum 604 rotates to continuously provide empty pockets to feeder 602 as shown in FIG. 22. Each pocket 612 is adapted or otherwise shaped or configured to receive an edible substrate therein.

In an embodiment, feeder 602 may include a hopper 616 and an alignment device 618. Alignment device 618 may include a vibration tray 620, a brush 622 or a combination thereof. Alignment device may properly align, configure, and/or place each edible substrate in a respective pocket 612.

In an embodiment, each edible substrate 614 may have more than one side, each edible substrate having an ink indicia 624 on a single side. In other words, the edible substrates may have been subjected to a printing procedure prior to being received by feeder 602. The ink indicia and/or edible substrate may be any as described herein. Edible substrates 614 are delivered into the pockets 612 with the ink indicia exposed or with the ink indicia unexposed or not visible as previously discussed. In other words, a misoriented edible substrate 626 does not have the ink indicia exposed, the ink indicia being in contact with the pocket surface. Thus, the edible substrates in the pockets may be a random array of properly oriented edible substrates and misoriented edible substrates 626.

Rotatable drum 604 rotates in the direction of arrow Z to move edible substrates 614 in each pocket 612 to a discharge position EE. Proximate to the outer circumferential surface of rotatable drum 604 is detector 606. Detector 606 is downstream of feeder 602 and upstream of discharge position EE as shown in FIG. 22. Detector 606 may be any device capable of detecting the presence and/or absence of ink indicia 624 on the exposed surface of each edible substrate as the edible substrates pass by the detector as is commonly known in the art. When detector 606 detects the presence of a misoriented edible substrate in a pocket, the detector 606 sends a signal to controller 608. Controller 608 is in operative communication with detector 606, optionally rotatable drum 604 and retainer 610. Controller 608 has logic capable of identifying the pocket wherein the misoriented edible substrate lays. Controller 608 also has suitable logic to track or otherwise monitor the incremental movement of each pocket as rotatable drum moves each pocket to discharge position EE.

When misoriented edible substrate 626 arrives at discharge position EE, controller 608 may direct retainer 610 to retain misoriented edible substrate 626 within pocket 612 as shown in FIG. 23. Retainer 610 may be any device capable or otherwise adapted or configured to selectively retain edible substrates within respective pockets. In other words, retainer 610 retains an edible substrate within a pocket at the direction of controller 608. In an embodiment, retainer 610 may be a pressurizer that may selectively apply a positive pressure (blowing or ejecting pressure) or a negative pressure (i.e., suction) through an orifice 628 present in pocket 612. A non-limiting example of a suitable retainer may include a vacuum/reverse vacuum device. As seen in FIG. 23, retainer 610 retains, holds, or otherwise maintains misoriented edible substrate 626 within pocket 612 when the pocket is at discharge position EE. This is accomplished by retainer 610 applying a negative pressure, as indicated by arrow FF, through orifice 628.

In an embodiment, a transporter, such as a conveyor, may transport or deliver a package, such as a package 630 to discharge position EE. As shown in FIG. 23, pockets 612 come into registration with respective compartments 632, each compartment having a see-through panel 634 as previously discussed. FIG. 22 shows package 630 with two tracks of compartments. The skilled artisan will appreciate that package may include from 1 compartment track to 2, 3, 4, 5, or 6 compartment tracks, or 10 compartment tracks, or more than 10 compartment tracks, or any number of compartment tracks therebetween. It is understood that rotatable drum 604 will have a number of pocket tracks that corresponds to the number of compartment tracks. Activation of retainer 610 by controller 608 may be selective so that edible substrates 614 (i.e., non-misoriented edible substrates) move or otherwise fall freely from each pocket 612 into a respective compartment 632 at discharge position EE. Consequently, edible substrates 614 move into respective compartments so that ink indicia 624 is visible through compartment panel 634. In an embodiment, controller 608 may direct retainer 610 to apply a positive pressure, as indicated by arrow GG in FIG. 23, through orifice 628 in order to hasten the placement of edible substrate 614 into compartment 632.

In an embodiment, apparatus 600 may include a sensor 636 located at discharge position EE and proximate to package 630 as shown in FIGS. 22 and 23. Sensor 636 may be any device capable of, adapted to, or otherwise configured to detect the presence and/or absence of an edible substrate in compartment 632. Sensor 636 may be in operative communication with controller 608, controller 608 also in operative communication with a transporter, detector 606, and optionally with rotatable drum 604. When sensor 636 detects that an edible substrate has not been delivered to a compartment, the sensor sends a signal to controller 608. Controller 608 then directs the transporter to stop, thereby maintaining the empty compartment at discharge position EE. Rotatable drum 604 continues to rotate and moves another pocket containing an edible substrate to discharge position EE. Detector 606 and controller 608 operate as previously discussed to deliver only a properly oriented edible substrate into the empty compartment. When a properly oriented edible substrate is delivered to the waiting and empty compartment, sensor 636 detects the presence of the edible substrate in the compartment. Sensor 636 subsequently sends a signal to controller 608 indicating the presence of edible substrate 614 in compartment 632.

Controller 608 directs transporter to activate and move package 630 in the direction indicated by arrow HH in FIG. 22. This moves additional empty compartments into registration with pockets 612 to continue the packaging process. Thus, package 630 does not advance until each compartment receives an edible substrate at discharge position EE. In other words, sensor 636 ensures that every compartment 632 leaving discharge position EE contains an edible substrate.

In an embodiment, rotatable drum 604 is rotatable or otherwise movable to a recycle position (or a second discharge position) II as shown in FIGS. 22 and 24. At recycle position II, controller 608 directs retainer 610 to release or otherwise eject misoriented edible substrate 626 into a recycle device 638.

It is understood that properly oriented edible substrates may also arrive at recycle position. This may occur when sensor 636 detects the presence of an edible substrate in a compartment in a first compartment track and detects the absence of an edible substrate in a second compartment in a second compartment track. Such an event would halt the movement of the package until the empty compartment is filled. Thus, it may be necessary to increment the movement of rotatable drum 604 in order to fill an empty compartment (due to retention of a misoriented edible substrate), the drum increment delivering an edible substrate to the empty compartment in the first compartment track. The drum increment may require the retention of a properly oriented edible substrate along the second compartment track. This may be the case as the second compartment in the second compartment track may have been properly filled with an edible substrate upon registration with an initial pocket. Controller 608 may be provided or otherwise equipped with suitable logic to recognize the orientation of each edible substrate in each pocket and direct retainer 610 for retention or release of the edible substrate at recycle position II as necessary.

Recycle device 638 may be any device adapted or otherwise configure to receive misoriented edible substrate 626 from the rotatable drum. Non-limiting examples of suitable recycle devices include a container, a bin, a hopper, a tray, a ramp, a slide, and any combination thereof. Recycle device 638 may be equipped and/or configured to automatically return misoriented edible substrates to feeder 602. Alternatively, recycle device 638 may be a static component such as a receptacle or the like requiring manual delivery of the collected misoriented edible substrates by the receptacle back to feeder 602.

In an embodiment, apparatus 600 may include a printer 640 proximate to package 630 and downstream of discharge position EE as shown in FIG. 22. Printer may print a second ink indicia 642 on a second surface of each edible substrate 614, each edible substrate disposed or otherwise located in a respective compartment 632. Apparatus 600 may include a sealing device to place a seal on package 630. Thus, apparatus 600 may produce any packaged product as shown in FIGS. 14-18 and described herein.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An apparatus comprising:
   a first non-contact printer so constructed and arranged to apply a first edible ink indicia to an edible substrate, the printer located at a first print position;
   a package located at a discharge position;
   a first carrier so constructed and arranged to transport the edible substrate from the first print position to the package and orient same in the package so that the first ink indicia is visible through at least a portion of a panel of the package;
   a second printer so constructed and arranged to apply a second edible ink indicia to the edible substrate, the printer located at a second print position; and
   a second carrier so constructed and arranged to transport the package containing the edible substrate to the second print position.

2. The apparatus of claim 1 wherein the first non-contact printer is arranged to apply the first edible ink indicia on a first surface of the edible substrate and the second printer is arranged to apply the second edible ink indicia on a second surface of the edible substrate.

3. The apparatus of claim 1 wherein the first non-contact printer is in operative communication with the second printer.

4. An apparatus comprising:
   a feeder receiving a plurality of edible substrates, each edible substrate having at least one side, each edible substrate having an ink indicia on a side thereof;
   a carrier in operative communication with the feeder, the carrier having a plurality of pockets;
   a detector proximate to the carrier, the detector adapted to detect a misoriented edible substrate in at least one of the pockets of the carrier; and
   a controller in operative communication with the detector and an extractor, the extractor adapted to remove the misoriented edible substrate from the pocket.

5. The apparatus of claim 4 further comprising a package having a plurality of compartments, the package located at a first discharge position, the carrier constructed and arranged to discharge the edible substrates into a respective compartment of the package at the first discharge position, the ink indicia for each edible substrate visible through a panel of the compartment.

6. The apparatus of claim 5 further comprising a second carrier constructed and arranged to move the edible substrates in the package to a print position; and a printer arranged to print a second ink indicia on a second side of each edible substrate at the print position.

7. The apparatus of claim 4 further comprising a recycle device in operative communication with the extractor, the recycle device adapted to deliver the misoriented edible substrate to a second discharge position.

8. The apparatus of claim 7 wherein a package is located at the second discharge position, the package constructed and arranged to receive the misoriented edible substrate in a compartment of the package so that the ink indicia of the edible substrate is visible through a panel of the compartment and the edible substrate is no longer misoriented.

9. A packaging apparatus comprising:
   a feeder receiving a plurality of edible substrates, each edible substrate having at least one side, each edible substrate having an ink indicia on a side thereof;
   a drum in operative communication with the feeder, the drum having a plurality of pockets on an outer circumferential surface thereof, the drum adapted to rotate to a discharge position;

a detector proximate to the drum outer circumferential surface, the detector adapted to detect a misoriented edible substrate in at least one of the pockets of the drum; and a controller in operative communication with the detector and a retainer adapted to selectively retain the misoriented edible substrate in the pocket at the discharge position.

10. The apparatus of claim 9 further comprising a package having a plurality of compartments located at the discharge position, the drum adapted to discharge each edible substrate to a respective compartment so that the ink indicia for each edible substrate is visible through a panel of the compartment.

11. The apparatus of claim 10 further comprising a sensor at the discharge position, the sensor in operative communication with the controller, the sensor adapted to detect an empty compartment in the package at the discharge position.

12. The apparatus of claim 10 further comprising a printer proximate to the package, the printer constructed and arranged to print a second edible ink indicia on each edible substrate in a compartment.

13. The apparatus of claim 9 wherein the drum is adapted to move to a recycle position and the retainer is adapted to release the misoriented edible substrate into a recycle device.

* * * * *